(12) United States Patent
Tian et al.

(10) Patent No.: US 12,551,545 B2
(45) Date of Patent: Feb. 17, 2026

(54) AFRICAN SWINE FEVER VIRUS CHIMERIC PROTEIN, VACCINE COMPOSITION, PREPARATION METHOD AND USE THEREOF

(71) Applicant: PULIKE BIOLOGICAL ENGINEERING, INC., Luoyang (CN)

(72) Inventors: Kegong Tian, Henan (CN); Wenqiang Pang, Henan (CN); Xuke Zhang, Henan (CN)

(73) Assignee: PULIKE BIOLOGICAL ENGINEERING INC, Luoyang (CN)

( * ) Notice: Subject to any disclaimer, the term of this patent is extended or adjusted under 35 U.S.C. 154(b) by 754 days.

(21) Appl. No.: 17/758,182

(22) PCT Filed: Mar. 9, 2021

(86) PCT No.: PCT/CN2021/079792
§ 371 (c)(1),
(2) Date: Jun. 29, 2022

(87) PCT Pub. No.: WO2021/180088
PCT Pub. Date: Sep. 16, 2021

(65) Prior Publication Data
US 2023/0048677 A1    Feb. 16, 2023

(30) Foreign Application Priority Data
Mar. 13, 2020 (CN) .......................... 202010180036.8

(51) Int. Cl.
*A61K 39/12* (2006.01)
*A61K 39/00* (2006.01)
(Continued)

(52) U.S. Cl.
CPC .............. *A61K 39/12* (2013.01); *A61K 39/00* (2013.01); *A61P 31/20* (2018.01); *C07K 14/005* (2013.01);
(Continued)

(58) Field of Classification Search
None
See application file for complete search history.

(56) References Cited

U.S. PATENT DOCUMENTS

| 2,909,462 A | 10/1959 | Warfield et al. |
| 2023/0048677 A1* | 2/2023 | Tian .................. C12N 15/63 |

FOREIGN PATENT DOCUMENTS

| CN | 103172749 A | 6/2013 |
| CN | 110698543 A | 1/2020 |
| CN | 110760006 A | 2/2020 |

OTHER PUBLICATIONS

Cuevas-Romero et al. (Pathogens 2025, 14, 542).*
(Continued)

*Primary Examiner* — Shanon A. Foley
(74) *Attorney, Agent, or Firm* — John A. Miller; Shumaker, Loop & Kendrick, LLP

(57) ABSTRACT

Provided is an African swine fever virus chimeric protein. The chimeric protein comprises: (1) an African swine fever virus p72 domain I; (2) an African swine fever virus p72 domain II; (3) an African swine fever virus p72 domain III; and (4) an African swine fever virus antigenic protein. By using African swine fever virus p72 protein as a skeleton, the chimeric protein provided in the present invention will exhibit antigenic epitopes of African swine fever virus antigenic proteins p54, p30, CD2v, and p12, achieve a good immune effect, and can produce significant humoral and cell-mediated immune response.

14 Claims, 1 Drawing Sheet
Specification includes a Sequence Listing.

(51) Int. Cl.
  *A61P 31/20* (2006.01)
  *C07K 14/005* (2006.01)
(52) U.S. Cl.
  CPC .................. *C07K 2319/00* (2013.01); *C12N 2710/12022* (2013.01); *C12N 2710/12034* (2013.01); *C12N 2710/12052* (2013.01); *C12N 2710/12071* (2013.01)

(56) References Cited

OTHER PUBLICATIONS

Auer et al. (Animals 2024, 14, 2473).*
Zhang et al. (Microbial Pathogenesis. 2024; 197: 107063).*
Todd et al. Vaccine 15:564-570 (1997).
Lopera-Madrid, J. et al. "Saftey and immunogenicity of mammalian cell derived and Modified Vaccinia Ankara vectored African swine fever subunit antigens in swine" Veterinary Immunology and Immunopathology, vol. 185, Mar. 31, 2017 (Mar. 31, 2017).

* cited by examiner

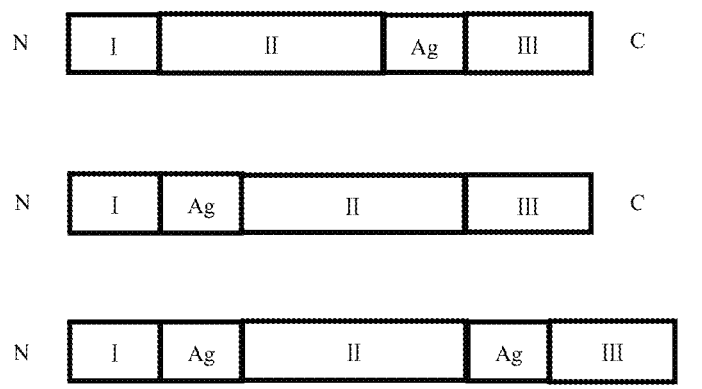

AFRICAN SWINE FEVER VIRUS CHIMERIC PROTEIN, VACCINE COMPOSITION, PREPARATION METHOD AND USE THEREOF

CROSS-REFERENCE TO RELATED APPLICATIONS

This application is a National Stage application of International Application No. PCT/CN2021/079792 filed on Mar. 9, 2021, which claims priority to Chinese Application No. 202010180036.8 filed Mar. 13, 2020.

SEQUENCE LISTING

This application includes a Sequence Listing that has been provided as a Portable Document Format (PDF) file and was created on Nov. 14, 2025, has the file name REPLACEMENT 11142025 and a file size of 3,863 KB. This Sequence Listing replaces all previous Sequence Listings and is hereby incorporated by reference.

BACKGROUND

Field

The invention belongs to the technical field of veterinary biological products, and in particular to an African swine fever virus chimeric protein, a vaccine composition containing the chimeric protein, a preparation method and use thereof.

Discussion of the Related Art

African swine fever (ASF) is an acute, severe and highly contagious infectious disease caused by African swine fever virus (ASFV), with a high morbidity rate and mortality rate which can be as high as 100%, classified as a Class I animal disease in China. The first occurrence of the disease was first confirmed in Kenya, Africa in 1921. Since 2007, African swine fever has occurred, spread and become epidemic in many countries around the world. It was introduced to China in 2018, causing huge direct and indirect economic losses. It has been nearly a hundred years since the disease was discovered, but there are currently no approved vaccines or specific drugs in the world.

The difficulties in the research and development of African swine fever vaccines are that the virus has a large genome, with many proteins and a complex structure, which is difficult to cultivate on a large scale, prone to have variation during the passage; the mechanism of viral immune escape is unclear, and there is no substantial progress in conventional inactivated vaccines and live attenuated vaccines; in addition, the improper use of live attenuated vaccines may lead to biosafety risks of reversion to virulence and virus diffusion.

SUMMARY

Therefore, the present invention used modern biological methods, analyzed the genes and proteins of pathogens and tested their immune protection ability, and developed protein engineering vaccines, which has effectively solved the problem of unsatisfactory immune effects of various vaccines at present.

In order to solve the deficiencies of the prior art, the present invention provides an African swine fever virus chimeric protein. When a vaccine is prepared by using the African swine fever virus chimeric protein, the immunization effect is excellent, and the problem of unsatisfactory immunization effect of various vaccines in the prior art is effectively solved.

One aspect of the present invention is to provide an African swine fever virus chimeric protein comprising:

(1) African swine fever virus p72 domain I, with an amino acid sequence as shown in SEQ ID NO.2;
(2) African swine fever virus p72 domain II, with an amino acid sequence as shown in SEQ ID NO.3;
(3) African swine fever virus p72 domain III, with an amino acid sequence as shown in SEQ ID NO. 4; and
(4) African swine fever virus antigenic protein;
(5) the African swine fever virus p72 domain I is located at the N-terminus of the chimeric protein, the African swine fever virus p72 domain III is located at the C-terminus of the chimeric protein, and the African swine fever virus p72 domain II is located between the domain I and the domain III, the African swine fever virus antigenic protein is located between the domain I and the domain II and/or between the domain II and the domain III.

As an embodiment of the present invention, the African swine fever virus antigenic protein contained in the African swine fever virus chimeric protein of the present invention is at least one of p54, p30, CD2v and p12 protein fragments.

As an embodiment of the present invention, the p54 protein fragment of the present invention is selected from any one or more of SEQ ID NO.5, 6, 7, 8, 9, 10, 11, and 12.

As an embodiment of the present invention, the p30 protein fragment of the present invention is selected from any one or more of SEQ ID NO. 13, 14, 15, 16, 17, 18, and 19.

As an embodiment of the present invention, the CD2v protein fragment of the present invention is selected from any one or more of SEQ ID NO. 20, 21, 22, 23, 24, 25, 26, 27, 28, 29 and 30.

As an embodiment of the present invention, the p12 protein fragment of the present invention is selected from any one or more of SEQ ID NO. 31, 32, 33, 34, 35, 36, and 37.

As an embodiment of the present invention, the African swine fever virus antigenic protein contained in the African swine fever virus chimeric protein of the present invention is a p54+p30 protein fragment, and the p54+p30 protein fragment is selected from any one or more of SEQ ID NO. 38, 39 and 40.

As an embodiment of the present invention, the African swine fever virus antigenic protein contained in the African swine fever virus chimeric protein of the present invention is a p54+CD2v protein fragment, and the p54+CD2v protein fragment is selected from any one or more of SEQ ID NO. 41, 42 and 43.

As an embodiment of the present invention, the African swine fever virus antigenic protein contained in the African swine fever virus chimeric protein of the present invention is a p30+CD2v protein fragment, and the p30+CD2v protein fragment is selected from any one or more of SEQ ID NO. 44, 45 and 46.

As an embodiment of the present invention, the African swine fever virus antigenic protein contained in the African swine fever virus chimeric protein of the present invention is a p30+p12 protein fragment, and the p30+p12 protein fragment is selected from any one or more of SEQ ID NO. 47, 48 and 49.

As an embodiment of the present invention, the African swine fever virus antigenic protein contained in the African swine fever virus chimeric protein of the present invention is a CD2v+p12 protein fragment, and the CD2v+p12 protein fragment is selected from any one or more of SEQ ID NO. 50, 51 and 52.

As an embodiment of the present invention, the African swine fever virus antigenic protein contained in the African swine fever virus chimeric protein of the present invention is a p54+p30+CD2v protein fragment, and the p54+p30+CD2v protein fragment is selected from any one or more of SEQ ID NO. 53, 54 and 55.

As an embodiment of the present invention, the African swine fever virus antigenic protein contained in the African swine fever virus chimeric protein of the present invention is p54+p30+CD2v+p12 protein fragment, and the p54+p30+CD2v+p12 protein fragment is selected from any one or more of SEQ ID NO. 56, 57 and 58.

As an embodiment of the present invention, the African swine fever virus chimeric protein of the present invention further comprises a T cell immune activation epitope, the T cell immune activation epitope include but are not limited to a cholera toxoid T cell epitope and/or a diphtheria toxin T cell epitope and/or a tetanus toxoid T cell epitope and/or an *Escherichia coli* heat-labile enterotoxin T cell epitope.

As an embodiment of the present invention, the diphtheria toxin T cell epitope of the present invention is selected from any one or more of SEQ ID NO.59, 60, 61, 62, 63, 64 and 65.

As an embodiment of the present invention, the tetanus toxoid T cell epitope of the present invention is selected from any one or more of SEQ ID NO.66, 67, 68, 69, 70, 71, 72, 73, 74 and 75.

As an embodiment of the present invention, the African swine fever virus chimeric protein of the present invention further includes a flexible linking peptide, and the flexible linking peptide has a length of 4-10 amino acids. The flexible linking peptide can make the chimeric protein have better affinity, mainly due to the fact that the flexible linking peptide increases the space between the structural functional domains, eliminates or reduces the spatial physical hindrance between adjacent structural functional domains, increases the relative independence of each structural functional domain of the chimeric protein, and at the same time also increases the structural stability and biological function of each functional region of the chimeric protein.

As an embodiment of the present invention, the flexible linking peptide selected in the present invention is GGGS (SEQ ID NO. 76).

A second aspect of the present invention is to provide a method for preparing an African swine fever virus chimeric protein comprising:
(1) artificially synthesizing a gene of the African swine fever virus chimeric protein, and linking it to a cloning vector, that is, a cloning vector of the chimeric protein by means of genetic engineering;
(2) constructing an expression vector comprising the gene of the chimeric protein, that is, an expression vector of the chimeric protein by digesting the constructed cloning vector of the chimeric protein and an expression vector with enzyme;
(3) introducing the expression vector of the chimeric protein into the recipient bacteria to induce expression, and identifying the expressed chimeric protein to obtain the African swine fever virus chimeric protein.

As an embodiment of the present invention, the African swine fever virus chimeric protein of the present invention can be prepared by a prokaryotic expression system, a eukaryotic expression system or a chemical synthesis method.

The third aspect of the present invention is to provide a polynucleotide encoding the African swine fever virus chimeric protein.

The fourth aspect of the present invention is to provide an expression vector containing the polynucleotide sequence. According to common knowledge in the art, those skilled in the art can obtain the nucleotide sequence encoding the corresponding amino acid sequence according to the amino acid sequence of the African swine fever chimeric protein disclosed above, and then obtain the polynucleotide.

A fifth aspect of the present invention is to provide a genetically engineered African swine fever virus vaccine composition, comprising an immune amount of the African swine fever virus chimeric protein and a pharmaceutically acceptable carrier.

As an embodiment of the present invention, in the genetically engineered African swine fever virus vaccine composition of the present invention, the content of the African swine fever virus chimeric protein is 100-300 µg/ml.

African swine fever virus chimeric protein content can be selected from 100 µg/ml, 110 µg/ml, 120 µg/ml, 130 µg/ml, 140 µg/ml, 150 µg/ml, 160 µg/ml, 170 µg/ml, 180 µg/ml, 190 µg/ml, 200 µg/ml, 210 µg/ml, 220 µg/ml, 230 µg/ml, 240 µg/ml, 250 µg/ml, 260 µg/ml, 270 µg/ml, 280 µg/ml, 290 µg/ml and 300 µg/ml.

As an embodiment of the present invention, in the genetically engineered African swine fever virus vaccine composition of the present invention, the pharmaceutically acceptable carrier comprises an adjuvant which comprises one or more of (1) white oil, alhydrogel adjuvant, saponins, Avridine, DDA; (2) water-in-oil emulsion, oil-in-water emulsion, water-in-oil-in-water emulsion; or (3) polymers of acrylic or methacrylic acid, copolymers of maleic anhydride and alkenyl derivative; and the RIBI adjuvant system, Block co-polymer, SAF-M, monophosphoryl lipid A, Avridine lipid-amine adjuvant, heat-labile enterotoxin from *E. coli*, cholera toxin, IMS 1314, muramyl dipeptide, Montanide ISA 206, and Gel adjuvant; preferably, the saponin is Quil A, QS-21 or GPI-0100.

The content of the adjuvant is 5%-60% V/V, preferably 30%-60% V/V, more preferably 50% V/V.

As an embodiment of the present disclosure, the pharmaceutically acceptable carrier includes drugs, immunostimulants, antioxidants, surfactants, colorants, volatile oils, buffers, dispersants, propellants and preservatives; the immunostimulants include α-interferon, β-interferon, γ-interferon, granulocyte-macrophage colony stimulating factor (GM-CSF), macrophage colony stimulating factor (M-CSF) and interleukin 2 (IL2).

Methods well known in the art can be used to prepare such compositions.

The sixth aspect of the present invention is to provide a use of the genetically engineered African swine fever virus vaccine composition for the manufacture of a medicament for prevention of African swine fever.

The present invention has the following outstanding advantages:
The African swine fever virus chimeric protein of the present invention uses the African swine fever virus p72 protein as the backbone for the first time, and well displays the antigenic epitopes of the p54, p30, CD2v and p12 proteins, has good immune effect, and can produce significant humoral and cell-mediated immunity, which effectively solve the problem of poor immunogenicity currently faced by African swine fever virus vaccines; the vaccine composition can be expressed in a large amount by means of genetic engineering, which not only takes short time, but also easy to produce on a large scale, and has no biological safety risk.

BRIEF DESCRIPTION OF THE DRAWING

FIG. 1 is a schematic diagram of the chimeric proteins, "I" represents the African swine fever virus p72 domain I, "II" represents the African swine fever virus p72 domain II, "III" represents the African swine fever virus p72 domain III, "Ag" represents the African swine fever virus antigenic protein, "N" represents the N terminus of the chimeric protein, and "C" represents the C terminus of the chimeric protein.

DETAILED DESCRIPTION OF THE EMBODIMENTS

Embodiments of the present invention will be described hereinafter.

An "Antigen" refers to a substance that can induce an immune response in the body, that is, it can be specifically recognized and bound by the antigen receptor (TCR/BCR) on the surface of T/B lymphocytes, activate T/B cells, and make them proliferate and differentiate, produce immune response products (sensitized lymphocytes or antibodies), and can specifically bind to the corresponding products in vitro and in vivo.

The terms "vaccine" and "vaccine composition" as used in the present invention refer to a pharmaceutical composition containing an African swine fever virus chimeric protein, which can induce, stimulate or enhance the immune response of a swine against African swine fever virus.

The term "immune amount" should be understood as an "immunologically effective amount," also refers to an immunoprotective amount or an effective amount to produce an immune response, which is an amount of antigen effective to induce an immune response in a recipient, which immune amount is sufficient to prevent or ameliorate signs or symptoms of a disease including adverse health effects or complications of the disease. The immune response may be sufficient for diagnostic purposes or other tests or may be suitable for use in preventing signs or symptoms of a disease, including adverse health consequences caused by an infection caused by a pathogen, or complications of the disease. Humoral immunity or cell-mediated immunity or both may be induced. The immune response of the animal to the immunogenic composition may be assessed indirectly, for example, by measuring antibody titers and analyzing lymphocyte proliferation, or directly by monitoring signs or symptoms after challenge with wild-type strains, while protective immunity provided by the vaccine may be assessed by measuring, for example, clinical signs of subjects such as mortality, reduction in morbidity, temperature values, and overall physiological condition and overall health and performance of the subjects. The immune response may include, but are not limited to induction of cellular and/or humoral immunity.

The term "pharmaceutically acceptable carrier" refers to all components other than the ASFV chimeric antigen in the vaccine composition of the present disclosure which are carriers or diluents that do not cause significant irritation to an organism and do not abrogate the biological activity and properties of the administered compounds, preferably an adjuvant. The term "adjuvant" may include a compound selected from a group consisting of alhydrogel adjuvant, saponins e.g., Quil A. QS-21 (Cambridge Biotech Inc., Cambridge Mass.), GPI-0100 (Galenica Pharmaceuticals, Inc., Birmingham, Ala.), water-in-oil emulsion, oil-in-water emulsion, water-in-oil-in-water emulsion, the polymers of acrylic or methacylic acid and the copolymers of maleic anhydride and alkenyl derivative. The term "emulsion" may be based in particular on light liquid paraffin oil (European Pharmacopoeia type); isoprenoid oil such as squalane or squalene oil resulting from the oligomerization of alkenes, in particular of isobutene or decene; esters of acids or of alcohols containing a linear alkyl group, more particularly plant oils, ethyl oleate, propylene glycol di-(caprylate/caprate), glyceryl tri-(caprylate/caprate) or propylene glycol dioleate; esters of branched fatty acids or alcohols, in particular isostearic acid esters. The oil is used in combination with emulsifier to form the emulsion. The emulsifiers are preferably nonionic surfactants, in particular esters of sorbitan, of mannide (e.g. anhydromannitol oleate), of glycol, of polyglycerol, of propylene glycol and of oleic, isostearic, ricinoleic or hydroxy-stearic acid, which are optionally ethoxylated, and polyoxypropylene-polyoxyethylene block copolymers, in particular the Pluronic products, especially L121. See Hunter et al., The Theory and Practical Application of Adjuvants (Ed. Stewart-Tull, D. E. S). John Wiley and Sons, NY, pp 51-94 (1995) and Todd et al. Vaccine 15:564-570 (1997). For example, it is possible to use the SPT emulsion described on page 147 of "Vaccine Design, The Subunit and Adjuvant Approach" edited by M. Powell and M. Newman, Plenum Press, 1995, and the emulsion MF59 described on page 183 of the same book. The term "polymers of acrylic or methacrylic acid" preferably are the polymers of acrylic or methacrylic acid which are cross-linked, especially with polyalkenyl ethers of sugars or polyalcohols. These compounds are known by the term carbomer (Trade name, Carbopol) (Phameuropa Vol. 8, No. 2, June 1996). Persons skilled in the art can also refer to U.S. Pat. No. 2,909,462 which describes such acrylic polymers cross-linked with a polyhydroxylated compounds having at least 3 hydroxyl groups, preferably not more than 8, the hydrogen atoms of at least three hydroxyls being replaced by unsaturated aliphatic radicals having at least 2 carbon atoms. The preferred radicals are those containing from 2 to 4 carbon atoms, e.g. vinyls, allyls and other ethylenically unsaturated groups. The unsaturated radicals may themselves contain other substituents, such as methyl. The products sold under the name Carbopol, (BF Goodrich, Ohio. USA) are particularly appropriate. They are cross-linked with an allyl sucrose or with allyl pentaerythritol. Among them, there may be mentioned Carbopol 974P, 934P and 971 P, most preferably Carbopol 971P. For the term "copolymers of maleic anhydride and alkenyl derivative", EMA (Monsanto), which is the copolymer of maleic anhydride and ethylene, can also be considered. The dissolution of these polymers in water leads to an acid solution that will be neutralized, preferably to physiological pH, in order to give the adjuvant solution, into which the immunogenic, immunological or vaccine composition itself will be incorporated. The term "adjuvant" includes, but is not limited to, the RIBI adjuvant system (Ribi Inc.), Block co-polymer (CytRx, Atlanta Ga.), SAF-M (Chiron, Emeryville Calif.), monophosphoryl lipid A, Avridine lipid-amine adjuvant, heat-labile enterotoxin from E. coli (recombinant or otherwise), cholera toxin, IMS 1314, muramyl dipeptide, and Gel adjuvant among many others. Preferably, the adjuvant includes one or more of mineral oil, alhydrogel adjuvant, saponins, water-in-oil emulsion, oil-in-water emulsion, water-in-oil-in-water emulsion, the polymers of acrylic or methacylic acid, the copolymers of maleic anhydride and alkenyl derivative, the RIBI adjuvant system, Block copolymer, SAF-M, monophosphoryl lipid A, Avridine lipid-amine adjuvant, heat-labile enterotoxin from *E. coli*, cholera toxin, IMS 1314, muramyl dipeptide, Montanide ISA 206 and Gel adjuvant.

The term "prevention" when referring to ASFV infection refers to the inhibition of ASFV replication, inhibition of ASFV transmission or prevention of ASFV colonization in its host, and alleviation a disease or symptoms of disease of ASFV infection.

The description of the present disclosure is further provided as follows with reference to the specific embodiments, and features and advantages of the present disclosure will become more apparent from the following description. However, these embodiments are merely exemplary and do not limit the scope of the present disclosure in any way. It should be understood by a person skilled in the art that modifications or alternatives to details and forms of the technical solution of the present disclosure without deviation from the spirit and scope of the present disclosure will be allowed, while those modifications and alternatives should all fall within the scope of the present disclosure.

The chemical reagents used in the examples of the present disclosure are of analytical grade and are purchased from Sinopharm Group Co. Ltd. The experimental methods described in the present disclosure are conventional methods unless otherwise specified. The biological materials are commercially available unless otherwise specified.

Example 1

Expression of Full-Length and Truncated Proteins of African Swine Fever Virus p72

The corresponding nucleotide sequence encoding the amino acid sequence of the p72 protein shown in SEQ ID NO.1 was synthesized by GENEWIZ, Inc., and the synthesized nucleotides were cloned into the pET28a vector and renamed as the recombinant plasmid pET28a-p72.

Similarly, the African swine fever virus p72 domain I shown by SEQ ID NO.2 in the sequence listing, the African swine fever virus p72 domain II shown by SEQ ID NO.3 in the sequence listing, and the African swine fever virus p72 domain III shown by SEQ ID NO.4 in the sequence listing were linked by a flexible linking peptide, wherein the African swine fever virus p72 domain I is located at the N-terminus, domain III is located at the C-terminus, and domain II is located between domain I and domain III. The corresponding encoding nucleotide sequence was synthesized by GENEWIZ, Inc., and the synthesized nucleotides were cloned into the pET28a vector and renamed as the recombinant plasmid pET28a-Δp72.

The above recombinant plasmids pET28a-p72 and pET28a-Δp72 were transformed into competent *Escherichia coli* BL21 (DE3), respectively, to construct expression strain 1 and expression strain 2, which were inoculated into 50 ml of kanamycin-resistant LB liquid medium at 37° C., cultivated with shaking at 230 rpm for 12 hours, and transferred to 1 L of LB liquid medium and cultured at 37° C. to prepare seed broth for fermentation.

The fermentation tank is a 50 L fermentation tank (Shanghai Baoxing Bio-Engineer Equipment Co., Ltd.). 30 L of culture medium was prepared and put into the fermentation tank, sterilized at 121° C. for 30 minutes. On the next day, 3 L of seed broth was introduced to the fermentation tank, and when the concentration of cell culture reached about 10 $OD_{600}$, the culture temperature was lowered to 25° C., and IPTG was added to induce expression for 12 hours. When the fermentation density was about 40 ($OD_{600}$), the culture was stopped and the bacteria were collected by centrifugation.

The bacteria were resuspended, and broken 4 times at a pressure of 800 bar by using a homogenizer, which was then centrifuged at 13500 rpm for 40 min. The supernatant was retained and detected by 15% SOS-PAGE electrophoresis. The protein was roughly purified by ammonium sulfate fractional precipitation, followed by chromatography, and the purified protein was subjected to SOS-PAGE electrophoresis which showed that the target protein was purified and enriched.

Example 2

The Effect Of African Swine Fever Virus P72 Truncated Protein on Immunogenicity

The full-length p72 protein and truncated p72 protein prepared in Example 1 were added to an adjuvant, which was continuously stirred by an emulsifier at 800 rpm for 12 minutes during the process of adding, mixed well and stored at 4° C. Vaccine compositions containing full-length p72 protein or truncated p72 protein were prepared. Adjuvants suitable for use in the present disclosure may be adjuvants known to those skilled in the art. In the present disclosure, a biphasic adjuvant (water-in-oil-in-water emulsion), for example adjuvant ISA 206 (SEPPIC, France) was selected. The specific ratio of each component in the prepared vaccine is shown in Table 1.

TABLE 1

Component ratios of full-length and truncated ASFV p72 protein vaccine compositions

| Component | Vaccine 1 | Vaccine 2 |
|---|---|---|
| p72 protein (μg/ml) | 200 | 0 |
| Δp72 protein (μg/ml) | 0 | 200 |
| Biphasic adjuvant (V/V %) | 50% | 50% |

15 healthy and susceptible piglets negative for ASFV antibody and antigen with a weight of about 20 kg were selected and randomly divided into 3 groups, 5 pigs per group. Group 1 was immunized with vaccine 1, group 2 with immunized vaccine 2, and the third group was a blank control group. The immunization route of the immunization groups was intramuscular neck injection of 2 ml of vaccine, and the control group was immunized with the same amount of PBS+adjuvant. Immunization was performed twice with an interval of 14 days. Before the 1st immunization and on the 14th day after second immunization, blood samples were taken from each of the piglets.

An ELISA plate was coated with inactivated whole African swine fever virus antigen (purchased from EUROPEAN UNION REFERENCE LABORATORY FOR AFRICAN SWINE FEVER, URL-ASF) overnight at 4° C.; washed twice with phosphate buffered saline after discarding the coating solution; added with 5% bovine serum albumin BSA and blocked for 2 hours at 37° C.; washed twice with phosphate buffered saline after discarding the coating solution, and patted dry.

Sample Diluent: phosphate buffered saline.

Wash solution: phosphate buffered saline containing 0.05% v/v Tween®-20 (i.e., Polysorbate 20).

Secondary antibody: Enzyme-labeled goat anti-pig secondary antibody, which was used with a dilution of 1:2000.

Chromogenic solution: including solution A and solution B, among which, solution A is 20 mg of TMB added with 10 ml of anhydrous ethanol, diluted to 100 ml with $ddH_2O$, and aseptically distributed and packaged after mixing; solution B is 2.1 g of citric acid and 42.82 g of anhydrous Na2HPO, 0.64 ml of 0.75% urea hydrogen peroxide, diluted to 100 ml with $ddH_2O$, and aseptically distributed and packaged after mixing.

Stop solution: 2M $H_2SO_4$.

During testing, 50 μl of phosphate buffered saline was added to the wells of ELISA plate, then 50 μl of serum to be tested was added, followed by adding of negative and positive controls, incubated at 37° C. for 30 minutes, the plate was washed three times with wash solution, and goat anti-pig enzyme-labeled antibody was diluted with PBS by 1:2000 and added 100 μl/well into the reaction plate, and incubated at 37° C. for 30 minutes. The plate was washed three times with wash solution, 50 μl of chromogenic solution A and 50 μl of chromogenic solution B were added to each well, and the color was developed at 37° C. for 10 minutes. The absorbance OD450 nm was read with a microplate reader after adding of 50 μ/well of the stop solution for stopping reactions, and the judgment was made according to the result.

Judgment standard: considered as positive when OD value is above 0.19, negative when OD value is less than 0.19.

The test results are shown in Table 2.

TABLE 2

Detection results of the effect of truncated African swine fever virus p72 protein on immunogenicity

| Group | Coating antigen for detection | Before 1st immunization | 14 days after 2nd immunization |
|---|---|---|---|
| 1 | Inactivated whole virus antigen | 0.056 | 0.418 |
| 2 | | 0.058 | 0.422 |
| 3 | | 0.062 | 0.058 |

The results shows that both full-length and truncated ASFV p72 protein antibodies were tested as positive, and there was no difference in the values of antibody detection. It shows that the truncation of the AFSV p72 protein of the present invention does not affect its immunogenicity, and provides the possibility for the p72 protein to be used as a backbone to construct a chimeric protein.

Example 3

Selection Of African Swine Fever Virus Chimeric Protein Backbone And Antigenic Protein By analyzing the structure of the p72 protein of African swine fever virus, the inventors creatively truncated the protein, which still maintains the relative stability of the spatial structure of the protein, without affecting its immunogenicity. To this end, a truncated p72 protein was determined as the backbone of the chimeric protein of the present invention.

At the same time, the inventors have screened the following sequences after extensive experimental research combined with the analysis of the antigenic epitope of the immunogenic protein of African swine fever virus, and the chimeric protein can generate a higher immunogenic response when the African swine fever virus antigenic proteins contained in the chimeric protein is at least one of p54, p30, CD2v and p12 protein fragments.

The p54 protein fragment is selected from any one or more of SEQ ID NO.5, 6, 7, 8, 9, 10, 11 and 12;

The p30 protein fragment is selected from any one or more of SEQ ID NO. 13, 14, 15, 16, 17, 18 and 19;

CD2v protein fragments are selected from any one or more of SEQ ID NO. 20, 21, 22, 23, 24, 25, 26, 27, 28, 29 and 30;

The p12 protein fragment is selected from any one or more of SEQ ID NO. 31, 32, 33, 34, 35, 36 and 37.

Example 4

First Expression (Expression 1) of African Swine Fever Virus Chimeric Protein

Referring to the method of Example 1, SEQ ID NOs. 7 and 13 in Example 3 were inserted between the African swine fever virus p72 truncated protein domain I and domain II, and between domain II and domain III, respectively, to form four chimeric proteins, that is, from N-terminus to C-terminus: SEQ ID NO.2+SEQ ID NO.7+SEQ ID NO.3+SEQ ID NO.4, SEQ ID NO.2+SEQ ID NO.3+SEQ ID NO.7+SEQ ID NO.4, SEQ ID NO.2+SEQ ID NO.13+SEQ ID NO.3+SEQ ID NO.4, SEQ ID NO.2+SEQ ID NO.3+SEQ ID NO.13+SEQ ID NO.4. Expression strain 3, expression strain 4, expression strain 5 and expression strain 6 were constructed.

The expression strains 3, 4, 5, and 6 were cultured in a fermenter, respectively, and the proteins were collected and purified.

Example 5

The Effect of Different Insertion Sites on the Immunogenicity of Chimeric Proteins The four proteins expressed and collected in Example 4 were added with an adjuvant according to the method in Example 2 to prepare vaccine compositions. The specific component ratio of each vaccine composition is shown in Table 3.

TABLE 3

Component ratio of African swine fever virus chimeric protein vaccine compositions

| Group | Vaccine 3 | Vaccine 4 | Vaccine 5 | Vaccine 6 |
|---|---|---|---|---|
| Expression strain 3 protein (μg/ml) | 200 | 0 | 0 | 0 |
| Expression strain 4 protein (μg/ml) | 0 | 200 | 0 | 0 |
| Expression strain 5 protein (μg/ml) | 0 | 0 | 200 | 0 |
| Expression strain 6 protein (μg/ml) | 0 | 0 | 0 | 200 |
| Biphasic adjuvant (V/V %) | 50% | 50% | 50% | 50% |

25 healthy and susceptible piglets negative for ASFV antibody and antigen with a weight of about 20 kg were selected and randomly divided into 5 groups, 5 piglets per group. Groups 4-7 were immunized with vaccines 3-6 respectively, and group 8 was a blank control group. The immunization route of the immunization groups was intramuscular neck injection of 2 ml of vaccine, and the control group was immunized with the same amount of PBS+ adjuvant. Immunization was performed twice with an interval of 14 days. Before the 1$^{st}$ immunization and on the 14$^{th}$ day after second immunization, blood samples were taken from each of the piglets. The test results are shown in Table 4.

TABLE 4

Test results of the effects of different insertion sites on the immunogenicity of chimeric proteins

| Group | Coating antigen for detection | Before 1$^{st}$ immunization | 14 days after 2$^{nd}$ immunization |
|---|---|---|---|
| 4 | SEQ ID NO. 7 | 0.064 | 0.432 |
|   | SEQ ID NO. 2 + SEQ ID NO. 3 + SEQ ID NO. 4 | 0.059 | 0.416 |
|   | Inactivated whole virus antigen | 0.062 | 0.654 |
| 5 | SEQ ID NO. 7 | 0.062 | 0.435 |
|   | SEQ ID NO. 2 + SEQ ID NO. 3 + SEQ ID NO. 4 | 0.059 | 0.418 |
|   | Inactivated whole virus antigen | 0.063 | 0.656 |
| 6 | SEQ ID NO. 13 | 0.058 | 0.437 |
|   | SEQ ID NO. 2 + SEQ ID NO. 3 + SEQ ID NO. 4 | 0.057 | 0.423 |
|   | Inactivated whole virus antigen | 0.054 | 0.660 |
| 7 | SEQ ID NO. 13 | 0.062 | 0.435 |
|   | SEQ ID NO. 2 + SEQ ID NO. 3 + SEQ ID NO. 4 | 0.061 | 0.418 |
|   | Inactivated whole virus antigen | 0.058 | 0.658 |
| 8 | SEQ ID NO. 7 | 0.062 | 0.063 |
|   | SEQ ID NO. 13 | 0.066 | 0.065 |
|   | SEQ ID NO. 2 + SEQ ID NO. 3 + SEQ ID NO. 4 | 0.068 | 0.062 |
|   | Inactivated whole virus antigen | 0.054 | 0.058 |

The results shows that no matter the truncated p72 protein as the backbone or the inserted p54 protein fragment, or the whole chimeric protein, the four African swine fever virus chimeric proteins had certain immunogenicity; the immunogenicity of the chimeric proteins was better; there was no difference in immunogenicity between different insertion sites. It shows that different insertion sites had no effect on the immunogenicity of the African swine fever virus chimeric protein; after inserting the African swine fever virus antigenic protein, the immunogenicity of the truncated p72 protein as the backbone was not affected.

Example 6

Second Expression (Expression 2) of African Swine Fever Virus Chimeric Protein

SEQ ID NOs. 9, 16, 22, 23 and 32 in Example 3 were inserted between the truncated African swine fever virus p72 protein domain I and domain II, respectively, and SEQ ID NOs. 10, 18, 19, 25 and 35 were inserted between domain II and domain III, respectively, to form 10 chimeric proteins, that is, from N-terminus to C-terminus: SEQ ID NO.2+SEQ ID NO.9+SEQ ID NO.3+SEQ ID NO.4, SEQ ID NO.2+SEQ ID NO.16+SEQ ID NO.3+SEQ ID NO.4, SEQ ID NO.2+SEQ ID NO.22+SEQ ID NO.3+SEQ ID NO.4, SEQ ID NO.2+SEQ ID NO.23+SEQ ID NO.3+SEQ ID NO.4, SEQ ID NO.2+SEQ ID NO.32+SEQ ID NO.3+SEQ ID NO.4, SEQ ID NO.2+SEQ ID NO.3+SEQ ID NO.10+SEQ ID NO.4, SEQ ID NO.2+SEQ ID NO.3+SEQ ID NO.18+SEQ ID NO.4, SEQ ID NO.2+SEQ ID NO.3+SEQ ID NO.19+SEQ ID NO.4, SEQ ID NO.2+SEQ ID NO.3+SEQ ID NO.25+SEQ ID NO.4, SEQ ID NO.2+SEQ ID NO.3+SEQ ID NO.35+SEQ ID NO.4. Expression strains 7-16 were constructed.

The expression strains 7-16 were cultured in a fermenter, respectively, and the proteins were collected and purified.

Example 7

Immunogenicity Assay of Chimeric Proteins Containing a Single Antigenic Protein Fragment The 10 proteins expressed and collected in Example 6 were added with an adjuvant to prepare vaccine compositions with reference to the method of Example 2. The specific component ratios of each vaccine composition are shown in Tables 5 and 6.

TABLE 5

Component ratio 1 of chimeric protein vaccine composition containing a single antigenic protein fragment

| Group | Vaccine 7 | Vaccine 8 | Vaccine 9 | Vaccine 10 | Vaccine 11 |
|---|---|---|---|---|---|
| Expression strain 7 protein (μg/ml) | 200 | 0 | 0 | 0 | 0 |
| Expression strain 8 protein (μg/ml) | 0 | 200 | 0 | 0 | 0 |
| Expression strain 9 protein (μg/ml) | 0 | 0 | 200 | 0 | 0 |
| Expression strain 10 protein (μg/ml) | 0 | 0 | 0 | 200 | 0 |
| Expression strain 11 protein (μg/ml) | 0 | 0 | 0 | 0 | 200 |
| Biphasic adjuvant (V/V %) | 50% | 50% | 50% | 50% | 50% |

TABLE 6

Component ratio 2 of chimeric protein vaccine composition containing a single antigenic protein fragment

| Group | Vaccine 12 | Vaccine 13 | Vaccine 14 | Vaccine 15 | Vaccine 16 |
|---|---|---|---|---|---|
| Expression strain 12 protein (μg/ml) | 200 | 0 | 0 | 0 | 0 |
| Expression strain 13 protein (μg/ml) | 0 | 200 | 0 | 0 | 0 |
| Expression strain 14 protein (μg/ml) | 0 | 0 | 200 | 0 | 0 |
| Expression strain 15 protein (μg/ml) | 0 | 0 | 0 | 200 | 0 |
| Expression strain 16 protein (μg/ml) | 0 | 0 | 0 | 0 | 200 |
| Biphasic adjuvant (V/V %) | 50% | 50% | 50% | 50% | 50% |

55 healthy and susceptible piglets negative for ASFV antibody and antigen with a weight of about 20 kg were selected and randomly divided into 11 groups, 5 piglets per group. Groups 9-18 were immunized with vaccines 7-16 respectively, and group 19 was a blank control group. The immunization route of the immunization groups was intramuscular neck injection of 2 ml of vaccine, and the control group was immunized with the same amount of PBS+ adjuvant. Immunization was performed twice with an interval of 14 days. Before the 1st immunization and on the 14th day after second immunization, blood samples were taken from each of the piglets. The test results are shown in Table 7.

TABLE 7

Test results of immunogenicity of chimeric protein vaccine compositions containing a single antigenic protein fragment

| Group | Coating antigen for detection | Before 1st immunization | 14 days after 2nd immunization |
|---|---|---|---|
| 9 | Inactivated whole virus antigen | 0.054 | 0.654 |
| 10 | Inactivated whole virus antigen | 0.056 | 0.658 |
| 11 | Inactivated whole virus antigen | 0.063 | 0.665 |
| 12 | Inactivated whole virus antigen | 0.058 | 0.644 |
| 13 | Inactivated whole virus antigen | 0.065 | 0.624 |
| 14 | Inactivated whole virus antigen | 0.062 | 0.628 |
| 15 | Inactivated whole virus antigen | 0.062 | 0.646 |
| 16 | Inactivated whole virus antigen | 0.045 | 0.664 |
| 17 | Inactivated whole virus antigen | 0.063 | 0.637 |
| 18 | Inactivated whole virus antigen | 0.046 | 0.641 |
| 19 | Inactivated whole virus antigen | 0.046 | 0.044 |

The results show that all 10 African swine fever virus chimeric proteins had certain immunogenicity and were positive for antibodies; there was no difference between the immunogenicity of the chimeric protein vaccine compositions at different insertion sites.

Further, SEQ ID NOs. 5, 6, 8, 12, 14, 20, 21, 29, 30, and 31 in Example 3 were inserted between domain I and domain II of truncated African swine fever virus p72 protein, respectively and SEQ ID NOs. 11, 15, 17, 24, 26, 27, 28, 33, 34, 36, and 37 were inserted between domain II and domain III of truncated African swine fever virus p72 protein, respectively, to form 21 chimeric proteins. Expression strains were constructed to express the proteins, and the vaccine compositions were prepared by referring to the method of Example 2. The assay on piglets showed that the test results of the antibody on 14 days after the second immunization were between 0.622 and 0.664, and the results were positive. It is proved that the p54 protein fragment, the p30 protein fragment, the CD2v protein fragment and the p12 protein fragment selected by the present invention as the antigenic proteins of the chimeric protein all have certain immunological activities, and it is further shown that different insertion sites have no effect on the immunogenicity of African swine fever virus chimeric proteins.

Example 8

Third Expression (Expression 3) of African Swine Fever Virus Chimeric Protein

In this example, any two protein fragments screened by the present invention were inserted between domain II and domain III of truncated African swine fever virus p72 protein, which can alternatively be inserted between domain I and domain II of truncated African swine fever virus p72 protein, or can also be inserted between domain I and domain II and between domain II and domain III at the same time without any specific limitation. The schematic diagram is shown in FIG. 1. Referring to the method of Example 1, any two of the p54 protein fragment, p30 protein fragment, CD2v protein fragment, and p12 protein fragment in Example 3 were selected to form SEQ ID NO. 38, 39, 40, 41, 42, 43, 44, 45, 46, 47, 48, 49, 50, 51, and 52, which were inserted between domain II and domain III of the truncated African swine fever virus p72 protein, respectively, to form 15 chimeric proteins, that is, from the N-terminus to the C-terminus: SEQ ID NO.2+SEQ ID NO.3+SEQ ID NO.38+SEQ ID NO.4, SEQ ID NO.2+SEQ ID NO.3+SEQ ID NO.39+SEQ ID NO.4, SEQ ID NO.2+SEQ ID NO.3+SEQ ID NO.40+SEQ ID NO.4, SEQ ID NO.2+SEQ ID NO.3+SEQ ID NO.41+SEQ ID NO.4, SEQ ID NO.2+SEQ ID NO.3+SEQ ID NO.42+SEQ ID NO.4, SEQ ID NO.2+SEQ ID NO.3+SEQ ID NO.43+SEQ ID NO.4, SEQ ID NO.2+SEQ ID NO.3+SEQ ID NO.44+SEQ ID NO.4, SEQ ID NO.2+SEQ ID NO.3+SEQ ID NO.45+SEQ ID NO.4, SEQ ID NO.2+SEQ ID NO.3+SEQ ID NO.46+SEQ ID NO.4, SEQ ID NO.2+SEQ ID NO.3+SEQ ID NO.47+SEQ ID NO.4, SEQ ID NO.2+SEQ ID NO.3+SEQ ID NO.48+SEQ ID NO.4, SEQ ID NO.2+SEQ ID NO.3+SEQ ID NO.49+SEQ ID NO.4, SEQ ID NO.2+SEQ ID NO.3+SEQ ID NO.50+SEQ ID NO.4, SEQ ID NO.2+SEQ ID NO.3+SEQ ID NO.51+SEQ ID NO.4, SEQ ID NO.2+SEQ ID NO.3+SEQ ID NO.52+SEQ ID NO.4. Expression strains 17-31 were constructed.

The expression strains 17-31 were cultured in a fermenter, respectively, and the proteins were collected and purified.

Example 9

Immunogenicity Assay of Chimeric Proteins Containing Two Antigenic Protein Fragments The 15 proteins expressed and collected in Example 8 were added with an adjuvant to prepare vaccine compositions with reference to the method of Example 2. The specific component ratios of each vaccine composition are shown in Tables 8, 9, and 10.

TABLE 8

Component ratio 1 of chimeric protein vaccine composition containing two antigenic protein fragments

| Group | Vaccine 17 | Vaccine 18 | Vaccine 19 | Vaccine 20 | Vaccine 21 |
|---|---|---|---|---|---|
| Expression strain 17 protein (µg/ml) | 200 | 0 | 0 | 0 | 0 |
| Expression strain 18 protein (µg/ml) | 0 | 200 | 0 | 0 | 0 |
| Expression strain 19 protein (µg/ml) | 0 | 0 | 200 | 0 | 0 |
| Expression strain 20 protein (µg/ml) | 0 | 0 | 0 | 200 | 0 |
| Expression strain 21 protein (µg/ml) | 0 | 0 | 0 | 0 | 200 |
| Biphasic adjuvant (V/V %) | 50% | 50% | 50% | 50% | 50% |

TABLE 9

Component ratio 2 of chimeric protein vaccine composition containing two antigenic protein fragments

| Group | Vaccine 22 | Vaccine 23 | Vaccine 24 | Vaccine 25 | Vaccine 26 |
|---|---|---|---|---|---|
| Expression strain 22 protein (μg/ml) | 200 | 0 | 0 | 0 | 0 |
| Expression strain 23 protein (μg/ml) | 0 | 200 | 0 | 0 | 0 |
| Expression strain 24 protein (μg/ml) | 0 | 0 | 200 | 0 | 0 |
| Expression strain 25 protein (μg/ml) | 0 | 0 | 0 | 200 | 0 |
| Expression strain 26 protein (μg/ml) | 0 | 0 | 0 | 0 | 200 |
| Biphasic adjuvant (V/V %) | 50% | 50% | 50% | 50% | 50% |

TABLE 10

Component ratio 3 of chimeric protein vaccine composition containing two antigenic protein fragments

| Group | Vaccine 27 | Vaccine 28 | Vaccine 29 | Vaccine 30 | Vaccine 31 |
|---|---|---|---|---|---|
| Expression strain 27 protein (μg/ml) | 200 | 0 | 0 | 0 | 0 |
| Expression strain 28 protein (μg/ml) | 0 | 200 | 0 | 0 | 0 |
| Expression strain 29 protein (μg/ml) | 0 | 0 | 200 | 0 | 0 |
| Expression strain 30 protein (μg/ml) | 0 | 0 | 0 | 200 | 0 |
| Expression strain 31 protein (μg/ml) | 0 | 0 | 0 | 0 | 200 |
| Biphasic adjuvant (V/V %) | 50% | 50% | 50% | 50% | 50% |

80 healthy and susceptible piglets negative for ASFV antibody and antigen with a weight of about 20 kg were selected and randomly divided into 16 groups, 5 piglets per group. Groups 20-34 were immunized with vaccines 17-31 respectively, and group 35 was a blank control group. The immunization route of the immunization groups was intramuscular neck injection of 2 ml of vaccine, and the control group was immunized with the same amount of PBS+ adjuvant. Immunization was performed twice with an interval of 14 days. Before the $1^{st}$ immunization and on the $14^{th}$ day after second immunization, blood samples were taken from each of the piglets. The test results are shown in Table 11.

TABLE 11

Test results of immunogenicity of chimeric protein vaccine compositions containing two antigenic protein fragments

| Group | Coating antigen for detection | Before $1^{st}$ immunization | 14 days after $2^{nd}$ immunization |
|---|---|---|---|
| 20 | Inactivated whole virus antigen | 0.055 | 1.724 |
| 21 | Inactivated whole virus antigen | 0.058 | 1.738 |
| 22 | Inactivated whole virus antigen | 0.062 | 1.765 |
| 23 | Inactivated whole virus antigen | 0.054 | 1.784 |
| 24 | Inactivated whole virus antigen | 0.064 | 1.564 |
| 25 | Inactivated whole virus antigen | 0.065 | 1.628 |
| 26 | Inactivated whole virus antigen | 0.048 | 1.716 |
| 27 | Inactivated whole virus antigen | 0.046 | 1.666 |
| 28 | Inactivated whole virus antigen | 0.052 | 1.637 |
| 29 | Inactivated whole virus antigen | 0.048 | 1.541 |
| 30 | Inactivated whole virus antigen | 0.044 | 1.679 |
| 31 | Inactivated whole virus antigen | 0.064 | 1.702 |
| 32 | Inactivated whole virus antigen | 0.065 | 1.778 |
| 33 | Inactivated whole virus antigen | 0.048 | 1.622 |
| 34 | Inactivated whole virus antigen | 0.048 | 1.614 |
| 35 | Inactivated whole virus antigen | 0.044 | 0.048 |

The results show that the 15 African swine fever virus chimeric proteins all had good immunogenicity and were positive for antibodies. It shows that a chimeric protein inserted with two protein fragments has better immunogenicity than a chimeric protein inserted with a single protein fragment.

Example 10

Fourth Expression (Expression 4) of African Swine Fever Virus Chimeric Protein

Referring to the method of Example 1, any three or four of the p54 protein fragment, p30 protein fragment, CD2v protein fragment, and p12 protein fragment in Example 3 were selected to form SEQ ID NO. 53, 54, 55, 56, 57, 58, and inserted between domain II and domain III of truncated African swine fever virus p72 protein, respectively, to form six chimeric proteins, namely, that is, from the N-terminus to the C-terminus: SEQ ID NO.2+SEQ ID NO.3+SEQ ID NO.53+SEQ ID NO.4, SEQ ID NO.2+SEQ ID NO.3+SEQ ID NO.54+SEQ ID NO.4, SEQ ID NO.2+SEQ ID NO.3+ SEQ ID NO.55+SEQ ID NO.4, SEQ ID NO.2+SEQ ID NO.3+SEQ ID NO.56+SEQ ID NO.4, SEQ ID NO.2+SEQ ID NO.3+SEQ ID NO.57+SEQ ID NO.4, SEQ ID NO.2+ SEQ ID NO.3+SEQ ID NO.58+SEQ ID NO.4. Expression strains 32-37 were constructed.

The expression strains 32-37 were cultured in a fermenter, respectively, and the proteins were collected and purified.

Example 11

Immunogenicity Assay of Chimeric Proteins Containing More Than Two Antigenic Protein Fragments The 6 proteins expressed and collected in Example 10 were added with an adjuvant to prepare vaccine compositions with reference to the method of Example 2. The specific component ratio of each vaccine composition is shown in Table 12.

TABLE 12

Component ratio of chimeric protein vaccine composition containing more than two antigenic protein fragments

| Group | Vaccine 32 | Vaccine 33 | Vaccine 34 | Vaccine 35 | Vaccine 36 | Vaccine 37 |
|---|---|---|---|---|---|---|
| Expression strain 32 protein (μg/ml) | 200 | 0 | 0 | 0 | 0 | 0 |
| Expression strain 33 protein (μg/ml) | 0 | 200 | 0 | 0 | 0 | 0 |
| Expression strain 34 protein (μg/ml) | 0 | 0 | 200 | 0 | 0 | 0 |
| Expression strain 35 protein (μg/ml) | 0 | 0 | 0 | 200 | 0 | 0 |
| Expression strain 36 protein (μg/ml) | 0 | 0 | 0 | 0 | 200 | 0 |
| Expression strain 37 protein (μg/ml) | 0 | 0 | 0 | 0 | 0 | 200 |
| Biphasic adjuvant (V/V %) | 50% | 50% | 50% | 50% | 50% | 50% |

35 healthy and susceptible piglets negative for ASFV antibody and antigen with a weight of about 20 kg were selected and randomly divided into 7 groups, 5 piglets per group. Groups 36-41 were immunized with vaccines 32-37 respectively, and group 42 was a blank control group. The immunization route of the immunization groups was intramuscular neck injection of 2 ml of vaccine, and the control group was immunized with the same amount of PBS+ adjuvant. Immunization was performed twice with an interval of 14 days. Before the 1$^{st}$ immunization and on the 14$^{th}$ day after second immunization, blood samples were taken from each of the piglets. The test results are shown in Table 13.

TABLE 13

Test results of immunogenicity of chimeric protein vaccine compositions containing more than two antigenic protein fragments

| Group | Coating antigen for detection | Before 1$^{st}$ immunization | 14 days after 2$^{nd}$ immunization |
|---|---|---|---|
| 36 | Inactivated whole virus antigen | 0.043 | 2.248 |
| 37 | Inactivated whole virus antigen | 0.048 | 2.282 |
| 38 | Inactivated whole virus antigen | 0.054 | 2.249 |
| 39 | Inactivated whole virus antigen | 0.046 | 2.243 |
| 40 | Inactivated whole virus antigen | 0.061 | 2.229 |
| 41 | Inactivated whole virus antigen | 0.056 | 2.284 |
| 42 | Inactivated whole virus antigen | 0.052 | 0.054 |

The results show that the 6 African swine fever virus chimeric proteins all had good immunogenicity and were positive for antibodies. It shows that a chimeric protein inserted with more than two protein fragments has better immunogenicity than a chimeric protein inserted with a single protein fragment or two protein fragments.

Example 12

Fifth Expression (Expression 5) of African Swine Fever Virus Chimeric Protein

Referring to the method of Example 1, any one or more of the p54 protein fragment, p30 protein fragment, CD2v protein fragment, and p12 protein fragment in Example 3 were linked to T cell immune activation epitopes, including but not limited to cholera toxoid T cell epitopes and/or diphtheria toxin T cell epitopes and/or tetanus toxoid T cell epitopes and/or *Escherichia coli* heat-labile enterotoxin T cell epitopes, and then inserted into domain II and domain III of truncated African swine fever virus p72 protein to form a chimeric protein. In this example, two or three of the p54 protein fragment, p30 protein fragment, CD2v protein fragment, and p12 protein fragment in Example 3 were selected to form SEQ ID NO.38, 39, 45, 47, 52, and 54 which were linked to the diphtheria toxin T cell epitope SEQ ID NO.61 or the tetanus toxoid T cell epitope SEQ ID NO.70, respectively inserted between domain II and domain III of truncated African swine fever virus p72 protein, to form 12 chimeric proteins, that is, from the N-terminus to the C-terminus: SEQ ID NO.2+SEQ ID NO.3+SEQ ID NO.38+SEQ ID NO.4+SEQ ID NO.61, SEQ ID NO.2+SEQ ID NO.3+SEQ ID NO.39+SEQ ID NO.4+SEQ ID NO.61, SEQ ID NO.2+SEQ ID NO.3+SEQ ID NO.45+SEQ ID NO.4+SEQ ID NO.61, SEQ ID NO.2+SEQ ID NO.3+SEQ ID NO.47+SEQ ID NO.4+SEQ ID NO.61, SEQ ID NO.2+SEQ ID NO.3+SEQ ID NO.52+SEQ ID NO.4+SEQ ID NO.61, SEQ ID NO.2+SEQ ID NO.3+SEQ ID NO.54+SEQ ID NO.4+SEQ ID NO.61, SEQ ID NO.2+SEQ ID NO.3+SEQ ID NO.38+SEQ ID NO.4+SEQ ID NO.70, SEQ ID NO.2+SEQ ID NO.3+SEQ ID NO.39+SEQ ID NO.4+SEQ ID NO.70, SEQ ID NO.2+SEQ ID NO.3+SEQ ID NO.45+SEQ ID NO.4+SEQ ID NO.70, SEQ ID NO.2+SEQ ID NO.3+SEQ ID NO.47+SEQ ID NO.4+SEQ ID NO.70, SEQ ID NO.2+SEQ ID NO.3+SEQ ID NO.52+SEQ ID NO.4+SEQ ID NO.70, SEQ ID NO.2+SEQ ID NO.3+SEQ ID NO.54+SEQ ID NO.4+SEQ ID NO.70. Expression strains 38-49 were constructed.

The expression strains 38-49 were cultured in a fermenter, respectively, and the proteins were collected and purified.

Example 13

Immunogenicity Assay of Chimeric Proteins Containing T Cell Immune Activation Epitopes The 12 proteins expressed and collected in Example 12 were added with an adjuvant to prepare vaccine compositions with reference to the method of Example 2. The specific component ratios of each vaccine composition are shown in Tables 14, 15 and 16.

TABLE 14

Component ratio of chimeric protein vaccine composition containing diphtheria toxin T cell epitopes

| Group | Vaccine 38 | Vaccine 39 | Vaccine 40 | Vaccine 41 | Vaccine 42 | Vaccine 43 |
|---|---|---|---|---|---|---|
| Expression strain 38 protein (μg/ml) | 200 | 0 | 0 | 0 | 0 | 0 |
| Expression strain 39 protein (μg/ml) | 0 | 200 | 0 | 0 | 0 | 0 |
| Expression strain 40 protein (μg/ml) | 0 | 0 | 200 | 0 | 0 | 0 |
| Expression strain 41 protein (μg/ml) | 0 | 0 | 0 | 200 | 0 | 0 |
| Expression strain 42 protein (μg/ml) | 0 | 0 | 0 | 0 | 200 | 0 |

TABLE 14-continued

Component ratio of chimeric protein vaccine composition containing diphtheria toxin T cell epitopes

| Group | Vaccine 38 | Vaccine 39 | Vaccine 40 | Vaccine 41 | Vaccine 42 | Vaccine 43 |
|---|---|---|---|---|---|---|
| Expression strain 43 protein (μg/ml) | 0 | 0 | 0 | 0 | 0 | 200 |
| Biphasic adjuvant (V/V %) | 50% | 50% | 50% | 50% | 50% | 50% |

TABLE 15

Component ratio 1 of chimeric protein vaccine composition containing tetanus toxoid T cell epitopes

| Group | Vaccine 44 | Vaccine 45 | Vaccine 46 | Vaccine 47 | Vaccine 48 | Vaccine 49 |
|---|---|---|---|---|---|---|
| Expression strain 44 protein (μg/ml) | 100 | 0 | 0 | 0 | 0 | 0 |
| Expression strain 45 protein (μg/ml) | 0 | 100 | 0 | 0 | 0 | 0 |
| Expression strain 46 protein (μg/ml) | 0 | 0 | 100 | 0 | 0 | 0 |
| Expression strain 47 protein (μg/ml) | 0 | 0 | 0 | 100 | 0 | 0 |
| Expression strain 48 protein (μg/ml) | 0 | 0 | 0 | 0 | 100 | 0 |
| Expression strain 49 protein (μg/ml) | 0 | 0 | 0 | 0 | 0 | 100 |
| Biphasic adjuvant (V/V %) | 50% | 50% | 50% | 50% | 50% | 50% |

TABLE 16

Component ratio 2 of chimeric protein vaccine composition containing tetanus toxoid T cell epitopes

| Group | Vaccine 50 | Vaccine 51 | Vaccine 52 | Vaccine 53 | Vaccine 54 | Vaccine 55 |
|---|---|---|---|---|---|---|
| Expression strain 44 protein (μg/ml) | 300 | 0 | 0 | 0 | 0 | 0 |
| Expression strain 45 protein (μg/ml) | 0 | 300 | 0 | 0 | 0 | 0 |
| Expression strain 46 protein (μg/ml) | 0 | 0 | 300 | 0 | 0 | 0 |
| Expression strain 47 protein (μg/ml) | 0 | 0 | 0 | 300 | 0 | 0 |
| Expression strain 48 protein (μg/ml) | 0 | 0 | 0 | 0 | 300 | 0 |
| Expression strain 49 protein (μg/ml) | 0 | 0 | 0 | 0 | 0 | 300 |
| Biphasic adjuvant (V/V %) | 50% | 50% | 50% | 50% | 50% | 50% |

95 healthy and susceptible piglets negative for ASFV antibody and antigen with a weight of about 20 kg were selected and randomly divided into 19 groups, 5 piglets per group. Groups 43-60 were immunized with vaccines 38-55 respectively, and group 61 was a blank control group. The immunization route of the immunization groups was intramuscular neck injection of 2 ml of vaccine, and the control group was immunized with the same amount of PBS+ adjuvant. Immunization was performed twice with an interval of 14 days. Before the $1^{st}$ immunization and on the $14^{th}$ day after second immunization, blood samples were taken from each of the piglets. The test results are shown in Table 17.

TABLE 17

Test results of immunogenicity of chimeric proteins containing T cell immune activation epitopes

| Group | Coating antigen for detection | Before $1^{st}$ immunization | 14 days after $2^{nd}$ immunization |
|---|---|---|---|
| 43 | Inactivated whole virus antigen | 0.046 | 2.418 |
| 44 | Inactivated whole virus antigen | 0.061 | 2.262 |
| 45 | Inactivated whole virus antigen | 0.056 | 2.238 |
| 46 | Inactivated whole virus antigen | 0.056 | 2.246 |
| 47 | Inactivated whole virus antigen | 0.052 | 2.347 |
| 48 | Inactivated whole virus antigen | 0.048 | 2.848 |
| 49 | Inactivated whole virus antigen | 0.044 | 2.202 |
| 50 | Inactivated whole virus antigen | 0.062 | 2.054 |
| 51 | Inactivated whole virus antigen | 0.056 | 2.012 |
| 52 | Inactivated whole virus antigen | 0.052 | 2.032 |
| 53 | Inactivated whole virus antigen | 0.048 | 2.086 |
| 54 | Inactivated whole virus antigen | 0.048 | 2.606 |
| 55 | Inactivated whole virus antigen | 0.062 | 2.634 |
| 56 | Inactivated whole virus antigen | 0.054 | 2.468 |
| 57 | Inactivated whole virus antigen | 0.043 | 2.447 |
| 58 | Inactivated whole virus antigen | 0.048 | 2.451 |
| 59 | Inactivated whole virus antigen | 0.054 | 2.561 |
| 60 | Inactivated whole virus antigen | 0.052 | 2.962 |
| 61 | Inactivated whole virus antigen | 0.048 | 0.054 |

The results show that the 12 ASFV chimeric proteins containing T cell immune activation epitopes all had good immunogenicity and were positive for antibodies. Their immunogenicity is better compared with the African swine fever virus chimeric proteins without adding T cell immune activation epitope verified in Example 9 and Example 11. It shows that the addition of T cell immune activation epitopes helped to further enhance the immune response.

Example 14

Effect of the African Swine Fever Virus Chimeric Protein Vaccine Compositions of the Present Invention on Cell-Mediated Immunity Peripheral blood lymphocytes were isolated from the peripheral blood of pigs from groups 20, 21, 27, 29 and 34 collected in Example 9, group 37 collected in Example 11, and groups 49-61 collected in Example 13, and detected by using Swine IFN Cytoset ELISPOT detection kit from Biosource Europe, and the number of spots were counted. The test results are shown in Table 18.

TABLE 18

Detection results of cell-mediated immunity of African swine fever virus chimeric protein vaccine composition

| Group | In vitro stimuli | Before 1st immunization | 14 days after 2nd immunization |
|---|---|---|---|
| 20 | SEQ ID NO. 2 ++ SEQ ID NO. 3 + SEQ ID NO. 38 + SEQ ID NO. 4 | 3.12 | 25.4 |
| 21 | SEQ ID NO. 2 + SEQ ID NO. 3 + SEQ ID NO. 39 + SEQ ID NO. 4 | 3.16 | 24.8 |
| 27 | SEQ ID NO. 2 + SEQ ID NO. 3 + SEQ ID NO. 45 + SEQ ID NO. 4 | 3.22 | 23.6 |
| 29 | SEQ ID NO. 2 + SEQ ID NO. 3 + SEQ ID NO. 47 + SEQ ID NO. 4 | 3.18 | 25.2 |
| 34 | SEQ ID NO. 2 + SEQ ID NO. 3 + SEQ ID NO. 52 + SEQ ID NO. 4 | 3.24 | 24.7 |
| 37 | SEQ ID NO. 2 + SEQ ID NO. 3 + SEQ ID NO. 54 + SEQ ID NO. 4 | 3.15 | 25.6 |
| 49 | SEQ ID NO. 2 ++ SEQ ID NO. 3 + SEQ ID NO. 38 + SEQ ID NO. 4 + SEQ ID NO. 70 | 3.18 | 85.4 |
| 50 | SEQ ID NO. 2 + SEQ ID NO. 3 + SEQ ID NO. 39 + SEQ ID NO. 4 + SEQ ID NO. 70 | 3.12 | 86.3 |
| 51 | SEQ ID NO. 2 + SEQ ID NO. 3 + SEQ ID NO. 45 + SEQ ID NO. 4 + SEQ ID NO. 70 | 3.22 | 84.9 |
| 52 | SEQ ID NO. 2 + SEQ ID NO. 3 + SEQ ID NO. 47 + SEQ ID NO. 4 + SEQ ID NO. 70 | 3.14 | 86.2 |
| 53 | SEQ ID NO. 2 + SEQ ID NO. 3 + SEQ ID NO. 52 + SEQ ID NO. 4 + SEQ ID NO. 70 | 3.13 | 84.7 |
| 54 | SEQ ID NO. 2 + SEQ ID NO. 3 + SEQ ID NO. 54 + SEQ ID NO. 4 + SEQ ID NO. 70 | 3.24 | 86.4 |
| 55 | SEQ ID NO. 2 + SEQ ID NO. 3 + SEQ ID NO. 38 + SEQ ID NO. 4 + SEQ ID NO. 70 | 3.21 | 105.2 |
| 56 | SEQ ID NO. 2 + SEQ ID NO. 3 + SEQ ID NO. 39 + SEQ ID NO. 4 + SEQ ID NO. 70 | 3.13 | 103.4 |
| 57 | SEQ ID NO. 2 + SEQ ID NO. 3 + SEQ ID NO. 45 + SEQ ID NO. 4 + SEQ ID NO. 70 | 3.14 | 102.6 |
| 58 | SEQ ID NO. 2 + SEQ ID NO. 3 + SEQ ID NO. 47 + SEQ ID NO. 4 + SEQ ID NO. 70 | 3.23 | 104.5 |
| 59 | SEQ ID NO. 2 + SEQ ID NO. 3 + SEQ ID NO. 52 + SEQ ID NO. 4 + SEQ ID NO. 70 | 3.24 | 102.8 |
| 60 | SEQ ID NO. 2 + SEQ ID NO. 3 + SEQ ID NO. 54 + SEQ ID NO. 4 + SEQ ID NO. 70 | 3.23 | 106.7 |
| 61 | PBS + adjuvant | 3.16 | 3.92 |

Note:
The number of detected cells is $10^6$ cells.

The results show that the African swine fever virus chimeric protein vaccine composition to which the T cell immune activation epitope is added can better stimulate the production of cell-mediated immunity, which is significantly higher than that of the African swine fever virus chimeric protein vaccine composition without the addition of T cell immune activation epitopes.

It shows that adding T cell immune activation epitope on the basis of the chimeric protein of the present invention is beneficial for cellular immune response.

Those are only preferred embodiments of the present invention as described above, which cannot be used to limit the present invention in any forms. Although the present invention has been revealed as described above in the form of the preferred embodiments, they are not intended to limit the present invention. Any skilled in the art can make several changes to the above technical content or modify the above technical content as equivalent embodiments with equivalent substitution, without departing from the technical scope of the present invention. Any simple change, equivalent substitution or modification etc. which are made to the above embodiments, based on the technical nature of the present invention, without departing from the content of technical solution of the present invention, should fall within the scope of protection of the present invention.

The invention claimed is:

1. An African swine fever virus chimeric protein comprising:
   a. African swine fever virus p72 domain I, with an amino acid sequence as shown in SEQ ID NO.2;
   b. African swine fever virus p72 domain II, with an amino acid sequence as shown in SEQ ID NO.3;
   c. African swine fever virus p72 domain III, with an amino acid sequence as shown in SEQ ID NO. 4; and
   d. African swine fever virus antigenic protein;
   e. the African swine fever virus p72 domain I is located at the N-terminus of the chimeric protein, the African swine fever virus p72 domain III is located at the C-terminus of the chimeric protein, and the African swine fever virus p72 domain II is located between the domain I and the domain III, the African swine fever virus antigenic protein is located between the domain I and the domain II or between the domain II and the domain III;
   f. the African swine fever virus antigenic protein is one fragment of p54, p30, CD2v and p12 proteins or one of the fragments as shown in SEQ ID NOs. 38-58;
   g. the fragment of p54 protein is selected from any one of SEQ ID NOs. 5, 6, 7, 8, 9, 10, 11, and 12;
   the fragment of p30 protein is selected from any one of SEQ ID NOs. 13, 14, 15, 16, 17, 18, and 19;
   the fragment of CD2v protein is selected from any one of SEQ ID NOs. 20, 21, 22, 23, 24, 25, 26, 27, 28, 29 and 30; and
   the fragment of p12 protein is selected from any one of SEQ ID NOs. 31, 32, 33, 34, 35, 36, and 37.

2. The African swine fever virus chimeric protein according to claim 1, wherein the African swine fever virus chimeric protein further comprises a T cell immune activation epitope, the T cell immune activation epitope is linked to the African swine fever virus antigenic protein, the T cell immune activation epitope includes a cholera toxoid T cell epitope or a diphtheria toxin T cell epitope or a tetanus toxoid T cell epitope or an *Escherichia coli* heat-labile enterotoxin T cell epitope.

3. The African swine fever virus chimeric protein according to claim 2, wherein the diphtheria toxin T cell epitope is SEQ ID NO. 61; and the tetanus toxoid T cell epitope is SEQ ID NO. 70.

4. The African swine fever virus chimeric protein according to claim 1, wherein the African swine fever virus chimeric protein further comprises a flexible linking peptide, and the flexible linking peptide has a length of 4-10 amino acids, and the African swine fever virus p72 domain I, II or III is linked to the flexible linking peptide.

5. A preparation method of African swine fever virus chimeric protein according to claim 1, wherein the method comprises:
   artificially synthesizing a gene of the African swine fever virus chimeric protein, and cloning it to a vector to form an expression vector comprising the gene of the chimeric protein; and
   introducing the expression vector comprising the gene of the chimeric protein into the recipient bacteria to induce expression, and identifying the expressed chimeric protein to obtain the African swine fever virus chimeric protein.

6. A polynucleotide encoding the African swine fever virus chimeric protein according to claim 1.

7. An expression vector comprising the polynucleotide sequence according to claim 6.

8. An African swine fever virus vaccine composition, comprising an immune amount of the African swine fever virus chimeric protein of claim 1 and a pharmaceutically acceptable carrier.

9. The African swine fever virus vaccine composition according to claim 8, wherein a content of the African swine fever virus chimeric protein is 100-300 µg/ml.

10. The African swine fever virus vaccine composition according to claim 9 wherein the content of the African swine fever virus chimeric protein is 200 µg/ml.

11. The African swine fever virus vaccine composition according to claim 8, wherein the pharmaceutically acceptable carrier comprises an adjuvant which comprises one or more of (1) mineral oil, alhydrogel adjuvant, saponins, Avridine; (2) water-in-oil emulsion, oil-in-water emulsion, water-in-oil-in-water emulsion; or (3) polymers of acrylic or methacrylic acid, copolymers of maleic anhydride and alkenyl derivative; and the RIBI adjuvant system, Block copolymer, monophosphoryl lipid A, Avridine lipid-amine adjuvant, heat-labile enterotoxin from *E. coli*, cholera toxin, IMS 1314, muramyl dipeptide, Montanide ISA 206, and Gel adjuvant; and the content of the adjuvant is 5%-60% V/V.

12. The African swine fever virus vaccine composition according to claim 11 wherein the content of the adjuvant is 30%-60% V/V.

13. The African swine fever virus vaccine composition according to claim 11 wherein the content of the adjuvant is 50% V/V.

14. A use of the African swine fever virus vaccine composition according to claim 8 for prevention of African swine fever, including a step of administering the African fever virus vaccine composition to a subject in need.

* * * * *

SEQUENCE LISTING

<160> NUMBER OF SEQ ID NOS: 75

<210> SEQ ID NO 1
<211> LENGTH: 646
<212> TYPE: PRT
<213> ORGANISM: Artificial Sequence
<220> FEATURE:
<223> OTHER INFORMATION: Synthetic Sequence

<400> SEQUENCE: 1

-continued

```
Met Ala Ser Gly Gly Ala Phe Cys Leu Ile Ala Asn Asp Gly Lys Ala
1               5                   10                  15

Asp Lys Ile Ile Leu Ala Gln Asp Leu Leu Asn Ser Arg Ile Ser Asn
            20                  25                  30

Ile Lys Asn Val Asn Lys Ser Tyr Gly Lys Pro Asp Pro Glu Pro Thr
        35                  40                  45

Leu Ser Gln Ile Glu Glu Thr His Leu Val His Phe Asn Ala His Phe
    50                  55                  60

Lys Pro Tyr Val Pro Val Gly Phe Glu Tyr Asn Lys Val Arg Pro His
65                  70                  75                  80

Thr Gly Thr Pro Thr Leu Gly Asn Lys Leu Thr Phe Gly Ile Pro Gln
                85                  90                  95

Tyr Gly Asp Phe Phe His Asp Met Val Gly His His Ile Leu Gly Ala
            100                 105                 110

Cys His Ser Ser Trp Gln Asp Ala Pro Ile Gln Gly Thr Ser Gln Met
        115                 120                 125

Gly Ala His Gly Gln Leu Gln Thr Phe Pro Arg Asn Gly Tyr Asp Trp
    130                 135                 140

Asp Asn Gln Thr Pro Leu Glu Gly Ala Val Tyr Thr Leu Val Asp Pro
145                 150                 155                 160

Phe Gly Arg Pro Ile Val Pro Gly Thr Lys Asn Ala Tyr Arg Asn Leu
                165                 170                 175

Val Tyr Tyr Cys Glu Tyr Pro Gly Glu Arg Leu Tyr Glu Asn Val Arg
            180                 185                 190

Phe Asp Val Asn Gly Asn Ser Leu Asp Glu Tyr Ser Ser Asp Val Thr
        195                 200                 205

Thr Leu Val Arg Lys Phe Cys Ile Pro Gly Asp Lys Met Thr Gly Tyr
    210                 215                 220

Lys His Leu Val Gly Gln Glu Val Ser Val Glu Gly Thr Ser Gly Pro
225                 230                 235                 240

Leu Leu Cys Asn Ile His Asp Leu His Lys Pro His Gln Ser Lys Pro
                245                 250                 255

Ile Leu Thr Asp Glu Asn Asp Thr Gln Arg Thr Cys Ser His Thr Asn
            260                 265                 270

Pro Lys Phe Leu Ser Gln His Phe Pro Glu Asn Ser His Asn Ile Gln
        275                 280                 285

Thr Ala Gly Lys Gln Asp Ile Thr Pro Ile Thr Asp Ala Thr Tyr Leu
    290                 295                 300

Asp Ile Arg Arg Asn Val His Tyr Ser Cys Asn Gly Pro Gln Thr Pro
305                 310                 315                 320

Lys Tyr Tyr Gln Pro Pro Leu Ala Leu Trp Ile Lys Leu Arg Phe Trp
                325                 330                 335

Phe Asn Glu Asn Val Asn Leu Ala Ile Pro Ser Val Ser Ile Pro Phe
            340                 345                 350

Gly Glu Arg Phe Ile Thr Ile Lys Leu Ala Ser Gln Lys Asp Leu Val
        355                 360                 365

Asn Glu Phe Pro Gly Leu Phe Val Arg Gln Ser Arg Phe Ile Ala Gly
    370                 375                 380

Arg Pro Ser Arg Arg Asn Ile Arg Phe Lys Pro Trp Phe Ile Pro Gly
385                 390                 395                 400

Val Ile Asn Glu Ile Ser Leu Thr Asn Asn Glu Leu Tyr Ile Asn Asn
                405                 410                 415
```

```
Leu Phe Val Thr Pro Glu Ile His Asn Leu Phe Val Lys Arg Val Arg
            420                 425                 430

Phe Ser Leu Ile Arg Val His Lys Thr Gln Val Thr His Thr Asn Asn
        435                 440                 445

Asn His His Asp Glu Lys Leu Met Ser Ala Leu Lys Trp Pro Ile Glu
    450                 455                 460

Tyr Met Phe Ile Gly Leu Lys Pro Thr Trp Asn Ile Ser Asp Gln Asn
465                 470                 475                 480

Pro His Gln His Arg Asp Trp His Lys Phe Gly His Val Val Asn Ala
                485                 490                 495

Ile Met Gln Pro Thr His His Ala Glu Ile Ser Phe Gln Asp Arg Asp
            500                 505                 510

Thr Ala Leu Pro Asp Ala Cys Ser Ser Ile Ser Asp Ile Ser Pro Val
        515                 520                 525

Thr Tyr Pro Ile Thr Leu Pro Ile Ile Lys Asn Ile Ser Val Thr Ala
530                 535                 540

His Gly Ile Asn Leu Ile Asp Lys Phe Pro Ser Lys Phe Cys Ser Ser
545                 550                 555                 560

Tyr Ile Pro Phe His Tyr Gly Gly Asn Ala Ile Lys Thr Pro Asp Asp
                565                 570                 575

Pro Gly Ala Met Met Ile Thr Phe Ala Leu Lys Pro Arg Glu Glu Tyr
            580                 585                 590

Gln Pro Ser Gly His Ile Asn Val Ser Arg Ala Arg Glu Phe Tyr Ile
        595                 600                 605

Ser Trp Asp Thr Asp Tyr Val Gly Ser Ile Thr Thr Ala Asp Leu Val
610                 615                 620

Val Ser Ala Ser Ala Ile Asn Phe Leu Leu Leu Gln Asn Gly Ser Ala
625                 630                 635                 640

Val Leu Arg Tyr Ser Thr
                645

<210> SEQ ID NO 2
<211> LENGTH: 42
<212> TYPE: PRT
<213> ORGANISM: Artificial Sequence
<220> FEATURE:
<223> OTHER INFORMATION: Synthetic Sequence

<400> SEQUENCE: 2

Phe Glu Tyr Asn Lys Val Arg Pro His Thr Gly Thr Pro Thr Leu Gly
1               5                   10                  15

Asn Lys Leu Thr Phe Gly Ile Pro Gln Tyr Gly Asp Phe His Asp
            20                  25                  30

Met Val Gly His His Ile Leu Gly Ala Cys
        35                  40

<210> SEQ ID NO 3
<211> LENGTH: 294
<212> TYPE: PRT
<213> ORGANISM: Artificial Sequence
<220> FEATURE:
<223> OTHER INFORMATION: Synthetic Sequence

<400> SEQUENCE: 3

Glu Asn Val Arg Phe Asp Val Asn Gly Asn Ser Leu Asp Glu Tyr Ser
1               5                   10                  15

Ser Asp Val Thr Thr Leu Val Arg Lys Phe Cys Ile Pro Gly Asp Lys
            20                  25                  30
```

Met Thr Gly Tyr Lys His Leu Val Gly Gln Glu Val Ser Val Glu Gly
            35                  40                  45

Thr Ser Gly Pro Leu Leu Cys Asn Ile His Asp Leu His Lys Pro His
 50                  55                  60

Gln Ser Lys Pro Ile Leu Thr Asp Glu Asn Asp Thr Gln Arg Thr Cys
 65                  70                  75                  80

Ser His Thr Asn Pro Lys Phe Leu Ser Gln His Phe Pro Glu Asn Ser
                 85                  90                  95

His Asn Ile Gln Thr Ala Gly Lys Gln Asp Ile Thr Pro Ile Thr Asp
            100                 105                 110

Ala Thr Tyr Leu Asp Ile Arg Arg Asn Val His Tyr Ser Cys Asn Gly
            115                 120                 125

Pro Gln Thr Pro Lys Tyr Tyr Gln Pro Pro Leu Ala Leu Trp Ile Lys
            130                 135                 140

Leu Arg Phe Trp Phe Asn Glu Asn Val Asn Leu Ala Ile Pro Ser Val
145                 150                 155                 160

Ser Ile Pro Phe Gly Glu Arg Phe Ile Thr Ile Lys Leu Ala Ser Gln
                165                 170                 175

Lys Asp Leu Val Asn Glu Phe Pro Gly Leu Phe Val Arg Gln Ser Arg
            180                 185                 190

Phe Ile Ala Gly Arg Pro Ser Arg Arg Asn Ile Arg Phe Lys Pro Trp
            195                 200                 205

Phe Ile Pro Gly Val Ile Asn Glu Ile Ser Leu Thr Asn Asn Glu Leu
            210                 215                 220

Tyr Ile Asn Asn Leu Phe Val Thr Pro Glu Ile His Asn Leu Phe Val
225                 230                 235                 240

Lys Arg Val Arg Phe Ser Leu Ile Arg Val His Lys Thr Gln Val Thr
                245                 250                 255

His Thr Asn Asn Asn His His Asp Glu Lys Leu Met Ser Ala Leu Lys
            260                 265                 270

Trp Pro Ile Glu Tyr Met Phe Ile Gly Leu Lys Pro Thr Trp Asn Ile
            275                 280                 285

Ser Asp Gln Asn Pro His
            290

<210> SEQ ID NO 4
<211> LENGTH: 94
<212> TYPE: PRT
<213> ORGANISM: Artificial Sequence
<220> FEATURE:
<223> OTHER INFORMATION: Synthetic Sequence

<400> SEQUENCE: 4

Pro Ile Ile Lys Asn Ile Ser Val Thr Ala His Gly Ile Asn Leu Ile
 1               5                  10                  15

Asp Lys Phe Pro Ser Lys Phe Cys Ser Ser Tyr Ile Pro Phe His Tyr
                 20                  25                  30

Gly Gly Asn Ala Ile Lys Thr Pro Asp Asp Pro Gly Ala Met Met Ile
             35                  40                  45

Thr Phe Ala Leu Lys Pro Arg Glu Glu Tyr Gln Pro Ser Gly His Ile
 50                  55                  60

Asn Val Ser Arg Ala Arg Glu Phe Tyr Ile Ser Trp Asp Thr Asp Tyr
 65                  70                  75                  80

Val Gly Ser Ile Thr Thr Ala Asp Leu Val Val Ser Ala Ser
                 85                  90

```
<210> SEQ ID NO 5
<211> LENGTH: 4
<212> TYPE: PRT
<213> ORGANISM: Artificial Sequence
<220> FEATURE:
<223> OTHER INFORMATION: Synthetic Sequence

<400> SEQUENCE: 5

Tyr Pro Arg His
1

<210> SEQ ID NO 6
<211> LENGTH: 8
<212> TYPE: PRT
<213> ORGANISM: Artificial Sequence
<220> FEATURE:
<223> OTHER INFORMATION: Synthetic Sequence

<400> SEQUENCE: 6

Ser Pro Val Thr Thr Pro Ser Phe
1               5

<210> SEQ ID NO 7
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 7

Tyr Pro Arg His Tyr Gly Glu Cys Leu Ser Pro Val Thr Thr Pro Ser
1               5                   10                  15

Phe Phe Ser Thr
            20

<210> SEQ ID NO 8
<211> LENGTH: 9
<212> TYPE: PRT
<213> ORGANISM: Artificial Sequence
<220> FEATURE:
<223> OTHER INFORMATION: Synthetic Sequence

<400> SEQUENCE: 8

Lys Lys Lys Ala Ala Ala Ile Glu Glu
1               5

<210> SEQ ID NO 9
<211> LENGTH: 52
<212> TYPE: PRT
<213> ORGANISM: Artificial Sequence
<220> FEATURE:
<223> OTHER INFORMATION: Synthetic Sequence

<400> SEQUENCE: 9

Pro Tyr Gln Asp Gln Gln Trp Val Glu Val Thr Pro Gln Pro Gly Thr
1               5                   10                  15

Ser Lys Pro Ala Gly Ala Thr Thr Ala Ser Val Gly Lys Pro Val Thr
            20                  25                  30

Gly Arg Pro Ala Thr Asn Arg Pro Ala Thr Asn Lys Pro Val Thr Asp
        35                  40                  45

Asn Pro Val Thr
    50
```

```
<210> SEQ ID NO 10
<211> LENGTH: 21
<212> TYPE: PRT
<213> ORGANISM: Artificial Sequence
<220> FEATURE:
<223> OTHER INFORMATION: Synthetic Sequence

<400> SEQUENCE: 10

Ala Thr Thr Ala Ser Val Gly Lys Pro Val Thr Gly Arg Pro Ala Thr
1               5                   10                  15

Asn Arg Pro Ala Thr
            20

<210> SEQ ID NO 11
<211> LENGTH: 33
<212> TYPE: PRT
<213> ORGANISM: Artificial Sequence
<220> FEATURE:
<223> OTHER INFORMATION: Synthetic Sequence

<400> SEQUENCE: 11

Thr Gly Gly Pro Ala Ala Ala Pro Ala Ala Ser Ala Pro Ala His
1               5                   10                  15

Pro Ala Glu Pro Tyr Thr Thr Val Thr Thr Gln Asn Thr Ala Ser Gln
            20                  25                  30

Thr

<210> SEQ ID NO 12
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 12

Thr Tyr Thr His Lys Asp
1               5

<210> SEQ ID NO 13
<211> LENGTH: 50
<212> TYPE: PRT
<213> ORGANISM: Artificial Sequence
<220> FEATURE:
<223> OTHER INFORMATION: Synthetic Sequence

<400> SEQUENCE: 13

Asp Ile Val Lys Ser Ala Arg Ile Tyr Ala Gly Gln Gly Tyr Thr Glu
1               5                   10                  15

His Gln Ala Gln Glu Glu Trp Asn Met Ile Leu His Val Leu Phe Glu
            20                  25                  30

Glu Glu Thr Glu Ser Ser Ala Ser Ser Glu Asn Ile His Glu Lys Asn
        35                  40                  45

Asp Asn
    50

<210> SEQ ID NO 14
<211> LENGTH: 13
<212> TYPE: PRT
<213> ORGANISM: Artificial Sequence
<220> FEATURE:
<223> OTHER INFORMATION: Synthetic Sequence

<400> SEQUENCE: 14

Tyr Ala Gly Gln Gly Tyr Thr Glu His Gln Ala Gln Glu
```

```
<210> SEQ ID NO 15
<211> LENGTH: 24
<212> TYPE: PRT
<213> ORGANISM: Artificial Sequence
<220> FEATURE:
<223> OTHER INFORMATION: Synthetic Sequence

<400> SEQUENCE: 15

Glu Thr Glu Ser Ser Ala Ser Ser Glu Asn Ile His Glu Lys Asn Asp
1               5                   10                  15

Asn Glu Thr Asn Glu Cys Thr Ser
            20

<210> SEQ ID NO 16
<211> LENGTH: 24
<212> TYPE: PRT
<213> ORGANISM: Artificial Sequence
<220> FEATURE:
<223> OTHER INFORMATION: Synthetic Sequence

<400> SEQUENCE: 16

Glu Thr Asn Glu Cys Thr Ser Ser Phe Glu Thr Leu Phe Glu Gln Glu
1               5                   10                  15

Pro Ser Ser Glu Val Pro Lys Asp
            20

<210> SEQ ID NO 17
<211> LENGTH: 11
<212> TYPE: PRT
<213> ORGANISM: Artificial Sequence
<220> FEATURE:
<223> OTHER INFORMATION: Synthetic Sequence

<400> SEQUENCE: 17

Glu Gln Glu Pro Ser Ser Glu Val Pro Lys Asp
1               5                   10

<210> SEQ ID NO 18
<211> LENGTH: 8
<212> TYPE: PRT
<213> ORGANISM: Artificial Sequence
<220> FEATURE:
<223> OTHER INFORMATION: Synthetic Sequence

<400> SEQUENCE: 18

Gln Tyr Gly Lys Ala Pro Asp Phe
1               5

<210> SEQ ID NO 19
<211> LENGTH: 12
<212> TYPE: PRT
<213> ORGANISM: Artificial Sequence
<220> FEATURE:
<223> OTHER INFORMATION: Synthetic Sequence

<400> SEQUENCE: 19

Thr Pro Leu Lys Glu Glu Lys Glu Val Val Arg
1               5                   10

<210> SEQ ID NO 20
<211> LENGTH: 10
<212> TYPE: PRT
<213> ORGANISM: Artificial Sequence
<220> FEATURE:
```

```
<223> OTHER INFORMATION: Synthetic Sequence

<400> SEQUENCE: 20

Ile Thr Asn Asp Asn Asn Asp Ile Asn Gly
1               5                   10

<210> SEQ ID NO 21
<211> LENGTH: 3
<212> TYPE: PRT
<213> ORGANISM: Artificial Sequence
<220> FEATURE:
<223> OTHER INFORMATION: Synthetic Sequence

<400> SEQUENCE: 21

Val Phe Asp
1

<210> SEQ ID NO 22
<211> LENGTH: 96
<212> TYPE: PRT
<213> ORGANISM: Artificial Sequence
<220> FEATURE:
<223> OTHER INFORMATION: Synthetic Sequence

<400> SEQUENCE: 22

Ser Ile Asp Tyr Trp Val Ser Phe Asn Lys Thr Ile Ile Leu Asp Ser
1               5                   10                  15

Asn Ile Thr Asn Asp Asn Asn Asp Ile Asn Gly Val Ser Trp Asn Phe
            20                  25                  30

Phe Asn Asn Ser Phe Asn Thr Leu Ala Thr Cys Gly Lys Ala Gly Asn
        35                  40                  45

Phe Cys Glu Cys Ser Asn Tyr Ser Thr Ser Ile Tyr Asn Ile Thr Asn
    50                  55                  60

Asn Cys Ser Leu Thr Ile Phe Pro His Asn Asp Val Phe Asp Thr Thr
65                  70                  75                  80

Tyr Gln Val Val Trp Asn Gln Ile Ile Asn Tyr Thr Ile Lys Leu Leu
                85                  90                  95

<210> SEQ ID NO 23
<211> LENGTH: 9
<212> TYPE: PRT
<213> ORGANISM: Artificial Sequence
<220> FEATURE:
<223> OTHER INFORMATION: Synthetic Sequence

<400> SEQUENCE: 23

Pro Ala Thr Pro Pro Asn Ile Thr Tyr
1               5

<210> SEQ ID NO 24
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 24

Lys Asn Asn Gly Thr Asn
1               5

<210> SEQ ID NO 25
<211> LENGTH: 42
<212> TYPE: PRT
<213> ORGANISM: Artificial Sequence
```

```
<220> FEATURE:
<223> OTHER INFORMATION: Synthetic Sequence

<400> SEQUENCE: 25

Lys Lys Asn Asn Gly Thr Asn Thr Asn Ile Tyr Leu Asn Ile Asn Asp
1               5                   10                  15

Thr Phe Val Lys Tyr Thr Asn Glu Ser Ile Leu Glu Tyr Asn Trp Asn
            20                  25                  30

Asn Ser Asn Ile Asn Asn Phe Thr Ala Thr
        35                  40

<210> SEQ ID NO 26
<211> LENGTH: 5
<212> TYPE: PRT
<213> ORGANISM: Artificial Sequence
<220> FEATURE:
<223> OTHER INFORMATION: Synthetic Sequence

<400> SEQUENCE: 26

Asn Asn Ser Asn Ile
1               5

<210> SEQ ID NO 27
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 27

Ile Ser Thr Ser Asn Glu
1               5

<210> SEQ ID NO 28
<211> LENGTH: 46
<212> TYPE: PRT
<213> ORGANISM: Artificial Sequence
<220> FEATURE:
<223> OTHER INFORMATION: Synthetic Sequence

<400> SEQUENCE: 28

Lys His Val Glu Glu Ile Glu Ser Pro Pro Glu Ser Asn Glu Glu
1               5                   10                  15

Glu Gln Cys Gln His Asp Asp Thr Thr Ser Ile His Gly Pro Ser Pro
            20                  25                  30

Arg Glu Pro Leu Leu Pro Lys Pro Tyr Ser Arg Tyr Gln Tyr
        35                  40                  45

<210> SEQ ID NO 29
<211> LENGTH: 49
<212> TYPE: PRT
<213> ORGANISM: Artificial Sequence
<220> FEATURE:
<223> OTHER INFORMATION: Synthetic Sequence

<400> SEQUENCE: 29

Met Arg Pro Ser Thr Gln Pro Leu Asn Pro Phe Pro Leu Pro Lys Pro
1               5                   10                  15

Cys Pro Pro Pro Lys Pro Cys Pro Pro Lys Pro Cys Pro Pro
            20                  25                  30

Lys Pro Cys Pro Ser Ala Glu Ser Tyr Ser Pro Lys Pro Leu Pro
        35                  40                  45

Ser
```

```
<210> SEQ ID NO 30
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 30

Ile Pro Pro Leu Ser Thr
1               5

<210> SEQ ID NO 31
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 31

Ala Leu Asp Gly Ser Ser
1               5

<210> SEQ ID NO 32
<211> LENGTH: 7
<212> TYPE: PRT
<213> ORGANISM: Artificial Sequence
<220> FEATURE:
<223> OTHER INFORMATION: Synthetic Sequence

<400> SEQUENCE: 32

Ser Ser Gly Gly Gly Ser Asn
1               5

<210> SEQ ID NO 33
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 33

Arg Gln Gln Lys Lys Cys
1               5

<210> SEQ ID NO 34
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 34

Lys Cys Ser Lys Ala Glu
1               5

<210> SEQ ID NO 35
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 35

Glu Cys Thr Cys Asn Asn
1               5
```

-continued

<210> SEQ ID NO 36
<211> LENGTH: 5
<212> TYPE: PRT
<213> ORGANISM: Artificial Sequence
<220> FEATURE:
<223> OTHER INFORMATION: Synthetic Sequence

<400> SEQUENCE: 36

Gly Ser Cys Ser Leu
1               5

<210> SEQ ID NO 37
<211> LENGTH: 4
<212> TYPE: PRT
<213> ORGANISM: Artificial Sequence
<220> FEATURE:
<223> OTHER INFORMATION: Synthetic Sequence

<400> SEQUENCE: 37

Leu Lys Thr Ser
1

<210> SEQ ID NO 38
<211> LENGTH: 49
<212> TYPE: PRT
<213> ORGANISM: Artificial Sequence
<220> FEATURE:
<223> OTHER INFORMATION: Synthetic Sequence

<400> SEQUENCE: 38

Ala Thr Thr Ala Ser Val Gly Lys Pro Val Thr Gly Arg Pro Ala Thr
1               5                   10                  15

Asn Arg Pro Ala Thr Gly Gly Gly Ser Glu Thr Asn Glu Cys Thr Ser
            20                  25                  30

Ser Phe Glu Thr Leu Phe Glu Gln Glu Pro Ser Ser Glu Val Pro Lys
        35                  40                  45

Asp

<210> SEQ ID NO 39
<211> LENGTH: 36
<212> TYPE: PRT
<213> ORGANISM: Artificial Sequence
<220> FEATURE:
<223> OTHER INFORMATION: Synthetic Sequence

<400> SEQUENCE: 39

Tyr Pro Arg His Tyr Gly Glu Cys Leu Ser Pro Val Thr Thr Pro Ser
1               5                   10                  15

Phe Phe Ser Thr Gly Gly Gly Ser Thr Pro Leu Lys Glu Glu Glu Lys
            20                  25                  30

Glu Val Val Arg
        35

<210> SEQ ID NO 40
<211> LENGTH: 87
<212> TYPE: PRT
<213> ORGANISM: Artificial Sequence
<220> FEATURE:
<223> OTHER INFORMATION: Synthetic Sequence

<400> SEQUENCE: 40

Thr Gly Gly Pro Ala Ala Ala Pro Ala Ala Ser Ala Pro Ala His
1               5                   10                  15

```
Pro Ala Glu Pro Tyr Thr Thr Val Thr Thr Gln Asn Thr Ala Ser Gln
                20                  25                  30

Thr Gly Gly Gly Ser Asp Ile Val Lys Ser Ala Arg Ile Tyr Ala Gly
                35                  40                  45

Gln Gly Tyr Thr Glu His Gln Ala Gln Glu Glu Trp Asn Met Ile Leu
 50                  55                  60

His Val Leu Phe Glu Glu Thr Glu Ser Ser Ala Ser Ser Glu Asn
 65                  70                  75                  80

Ile His Glu Lys Asn Asp Asn
                85
```

<210> SEQ ID NO 41
<211> LENGTH: 152
<212> TYPE: PRT
<213> ORGANISM: Artificial Sequence
<220> FEATURE:
<223> OTHER INFORMATION: Synthetic Sequence

<400> SEQUENCE: 41

```
Pro Tyr Gln Asp Gln Gln Trp Val Glu Val Thr Pro Gln Pro Gly Thr
 1               5                   10                  15

Ser Lys Pro Ala Gly Ala Thr Thr Ala Ser Val Gly Lys Pro Val Thr
                20                  25                  30

Gly Arg Pro Ala Thr Asn Arg Pro Ala Thr Asn Lys Pro Val Thr Asp
                35                  40                  45

Asn Pro Val Thr Gly Gly Ser Ser Ile Asp Tyr Trp Val Ser Phe
 50                  55                  60

Asn Lys Thr Ile Ile Leu Asp Ser Asn Ile Thr Asn Asp Asn Asn Asp
 65                  70                  75                  80

Ile Asn Gly Val Ser Trp Asn Phe Phe Asn Asn Ser Phe Asn Thr Leu
                85                  90                  95

Ala Thr Cys Gly Lys Ala Gly Asn Phe Cys Glu Cys Ser Asn Tyr Ser
                100                 105                 110

Thr Ser Ile Tyr Asn Ile Thr Asn Asn Cys Ser Leu Thr Ile Phe Pro
            115                 120                 125

His Asn Asp Val Phe Asp Thr Thr Tyr Gln Val Val Trp Asn Gln Ile
        130                 135                 140

Ile Asn Tyr Thr Ile Lys Leu Leu
145                 150
```

<210> SEQ ID NO 42
<211> LENGTH: 79
<212> TYPE: PRT
<213> ORGANISM: Artificial Sequence
<220> FEATURE:
<223> OTHER INFORMATION: Synthetic Sequence

<400> SEQUENCE: 42

```
Thr Gly Gly Pro Ala Ala Ala Pro Ala Ala Ser Ala Pro Ala His
 1               5                   10                  15

Pro Ala Glu Pro Tyr Thr Thr Val Thr Thr Gln Asn Thr Ala Ser Gln
                20                  25                  30

Thr Gly Gly Gly Ser Lys Lys Asn Asn Gly Thr Asn Thr Asn Ile Tyr
                35                  40                  45

Leu Asn Ile Asn Asp Thr Phe Val Lys Tyr Asn Glu Ser Ile Leu
 50                  55                  60

Glu Tyr Asn Trp Asn Asn Ser Asn Ile Asn Asn Phe Thr Ala Thr
 65                  70                  75
```

```
<210> SEQ ID NO 43
<211> LENGTH: 102
<212> TYPE: PRT
<213> ORGANISM: Artificial Sequence
<220> FEATURE:
<223> OTHER INFORMATION: Synthetic Sequence

<400> SEQUENCE: 43

Pro Tyr Gln Asp Gln Gln Trp Val Glu Val Thr Pro Gln Pro Gly Thr
1               5                   10                  15

Ser Lys Pro Ala Gly Ala Thr Thr Ala Ser Val Gly Lys Pro Val Thr
            20                  25                  30

Gly Arg Pro Ala Thr Asn Arg Pro Ala Thr Asn Lys Pro Val Thr Asp
        35                  40                  45

Asn Pro Val Thr Gly Gly Gly Ser Lys His Val Glu Glu Ile Glu Ser
    50                  55                  60

Pro Pro Pro Glu Ser Asn Glu Glu Gln Cys Gln His Asp Asp Thr
65                  70                  75                  80

Thr Ser Ile His Glu Pro Ser Pro Arg Glu Pro Leu Leu Pro Lys Pro
                85                  90                  95

Tyr Ser Arg Tyr Gln Tyr
            100

<210> SEQ ID NO 44
<211> LENGTH: 77
<212> TYPE: PRT
<213> ORGANISM: Artificial Sequence
<220> FEATURE:
<223> OTHER INFORMATION: Synthetic Sequence

<400> SEQUENCE: 44

Glu Thr Glu Ser Ser Ala Ser Ser Glu Asn Ile His Glu Lys Asn Asp
1               5                   10                  15

Asn Glu Thr Asn Glu Cys Thr Ser Gly Gly Ser Met Arg Pro Ser
            20                  25                  30

Thr Gln Pro Leu Asn Pro Phe Pro Leu Pro Lys Pro Cys Pro Pro Pro
        35                  40                  45

Lys Pro Cys Pro Pro Pro Lys Pro Cys Pro Pro Lys Pro Cys Pro
50                  55                  60

Ser Ala Glu Ser Tyr Ser Pro Pro Lys Pro Leu Pro Ser
65                  70                  75

<210> SEQ ID NO 45
<211> LENGTH: 150
<212> TYPE: PRT
<213> ORGANISM: Artificial Sequence
<220> FEATURE:
<223> OTHER INFORMATION: Synthetic Sequence

<400> SEQUENCE: 45

Asp Ile Val Lys Ser Ala Arg Ile Tyr Ala Gly Gln Gly Tyr Thr Glu
1               5                   10                  15

His Gln Ala Gln Glu Glu Trp Asn Met Ile Leu His Val Leu Phe Glu
            20                  25                  30

Glu Glu Thr Glu Ser Ser Ala Ser Ser Glu Asn Ile His Glu Lys Asn
        35                  40                  45

Asp Asn Gly Gly Gly Ser Ser Ile Asp Tyr Trp Val Ser Phe Asn Lys
    50                  55                  60
```

```
Thr Ile Ile Leu Asp Ser Asn Ile Thr Asn Asp Asn Asn Asp Ile Asn
 65                  70                  75                  80

Gly Val Ser Trp Asn Phe Phe Asn Asn Ser Phe Asn Thr Leu Ala Thr
                 85                  90                  95

Cys Gly Lys Ala Gly Asn Phe Cys Glu Cys Ser Asn Tyr Ser Thr Ser
            100                 105                 110

Ile Tyr Asn Ile Thr Asn Asn Cys Ser Leu Thr Ile Phe Pro His Asn
        115                 120                 125

Asp Val Phe Asp Thr Thr Tyr Gln Val Val Trp Asn Gln Ile Ile Asn
    130                 135                 140

Tyr Thr Ile Lys Leu Leu
145             150

<210> SEQ ID NO 46
<211> LENGTH: 58
<212> TYPE: PRT
<213> ORGANISM: Artificial Sequence
<220> FEATURE:
<223> OTHER INFORMATION: Synthetic Sequence

<400> SEQUENCE: 46

Thr Pro Leu Lys Glu Glu Lys Glu Val Val Arg Gly Gly Gly Gly Ser
1               5                  10                  15

Lys Lys Asn Asn Gly Thr Asn Thr Asn Ile Tyr Leu Asn Ile Asn Asp
            20                  25                  30

Thr Phe Val Lys Tyr Thr Asn Glu Ser Ile Leu Glu Tyr Asn Trp Asn
        35                  40                  45

Asn Ser Asn Ile Asn Asn Phe Thr Ala Thr
    50                  55

<210> SEQ ID NO 47
<211> LENGTH: 21
<212> TYPE: PRT
<213> ORGANISM: Artificial Sequence
<220> FEATURE:
<223> OTHER INFORMATION: Synthetic Sequence

<400> SEQUENCE: 47

Glu Gln Glu Pro Ser Ser Glu Val Pro Lys Asp Gly Gly Ser Ala
1               5                  10                  15

Leu Asp Gly Ser Ser
            20

<210> SEQ ID NO 48
<211> LENGTH: 19
<212> TYPE: PRT
<213> ORGANISM: Artificial Sequence
<220> FEATURE:
<223> OTHER INFORMATION: Synthetic Sequence

<400> SEQUENCE: 48

Gln Tyr Gly Lys Ala Pro Asp Phe Gly Gly Ser Ser Gly Gly
1               5                  10                  15

Gly Ser Asn

<210> SEQ ID NO 49
<211> LENGTH: 34
<212> TYPE: PRT
<213> ORGANISM: Artificial Sequence
<220> FEATURE:
<223> OTHER INFORMATION: Synthetic Sequence
```

-continued

```
<400> SEQUENCE: 49

Glu Thr Asn Glu Cys Thr Ser Ser Phe Glu Thr Leu Phe Gln Glu
1               5                   10                  15

Pro Ser Ser Glu Val Pro Lys Asp Gly Gly Ser Arg Gln Gln Lys
            20                  25                  30

Lys Cys

<210> SEQ ID NO 50
<211> LENGTH: 106
<212> TYPE: PRT
<213> ORGANISM: Artificial Sequence
<220> FEATURE:
<223> OTHER INFORMATION: Synthetic Sequence

<400> SEQUENCE: 50

Ser Ile Asp Tyr Trp Val Ser Phe Asn Lys Thr Ile Ile Leu Asp Ser
1               5                   10                  15

Asn Ile Thr Asn Asp Asn Asn Asp Ile Asn Gly Val Ser Trp Asn Phe
            20                  25                  30

Phe Asn Asn Ser Phe Asn Thr Leu Ala Thr Cys Gly Lys Ala Gly Asn
        35                  40                  45

Phe Cys Glu Cys Ser Asn Tyr Ser Thr Ser Ile Tyr Asn Ile Thr Asn
    50                  55                  60

Asn Cys Ser Leu Thr Ile Phe Pro His Asn Asp Val Phe Asp Thr Thr
65                  70                  75                  80

Tyr Gln Val Val Trp Asn Gln Ile Ile Asn Tyr Thr Ile Lys Leu Leu
                85                  90                  95

Gly Gly Gly Ser Lys Cys Ser Lys Ala Glu
            100                 105

<210> SEQ ID NO 51
<211> LENGTH: 52
<212> TYPE: PRT
<213> ORGANISM: Artificial Sequence
<220> FEATURE:
<223> OTHER INFORMATION: Synthetic Sequence

<400> SEQUENCE: 51

Lys Lys Asn Asn Gly Thr Asn Thr Asn Ile Tyr Leu Asn Ile Asn Asp
1               5                   10                  15

Thr Phe Val Lys Tyr Thr Asn Glu Ser Ile Leu Glu Tyr Asn Trp Asn
            20                  25                  30

Asn Ser Asn Ile Asn Asn Phe Thr Ala Thr Gly Gly Gly Ser Glu Cys
        35                  40                  45

Thr Cys Asn Asn
    50

<210> SEQ ID NO 52
<211> LENGTH: 55
<212> TYPE: PRT
<213> ORGANISM: Artificial Sequence
<220> FEATURE:
<223> OTHER INFORMATION: Synthetic Sequence

<400> SEQUENCE: 52

Lys His Val Glu Glu Ile Glu Ser Pro Pro Glu Ser Asn Glu Glu
1               5                   10                  15

Glu Gln Cys Gln His Asp Asp Thr Thr Ser Ile His Glu Pro Ser Pro
            20                  25                  30
```

Arg Glu Pro Leu Leu Pro Lys Pro Tyr Ser Arg Tyr Gln Tyr Gly Gly
            35                  40                  45

Gly Ser Gly Ser Cys Ser Leu
    50                  55

<210> SEQ ID NO 53
<211> LENGTH: 175
<212> TYPE: PRT
<213> ORGANISM: Artificial Sequence
<220> FEATURE:
<223> OTHER INFORMATION: Synthetic Sequence

<400> SEQUENCE: 53

Ala Thr Thr Ala Ser Val Gly Lys Pro Val Thr Gly Arg Pro Ala Thr
1               5                   10                  15

Asn Arg Pro Ala Thr Gly Gly Gly Ser Asp Ile Val Lys Ser Ala Arg
            20                  25                  30

Ile Tyr Ala Gly Gln Gly Tyr Thr Glu His Gln Ala Gln Glu Glu Trp
        35                  40                  45

Asn Met Ile Leu His Val Leu Phe Glu Glu Glu Thr Glu Ser Ser Ala
    50                  55                  60

Ser Ser Glu Asn Ile His Glu Lys Asn Asp Asn Gly Gly Gly Ser Ser
65                  70                  75                  80

Ile Asp Tyr Trp Val Ser Phe Asn Lys Thr Ile Ile Leu Asp Ser Asn
                85                  90                  95

Ile Thr Asn Asp Asn Asn Asp Ile Asn Gly Val Ser Trp Asn Phe Phe
            100                 105                 110

Asn Asn Ser Phe Asn Thr Leu Ala Thr Cys Gly Lys Ala Gly Asn Phe
        115                 120                 125

Cys Glu Cys Ser Asn Tyr Ser Thr Ser Ile Tyr Asn Ile Thr Asn Asn
    130                 135                 140

Cys Ser Leu Thr Ile Phe Pro His Asn Asp Val Phe Asp Thr Thr Tyr
145                 150                 155                 160

Gln Val Val Trp Asn Gln Ile Ile Asn Tyr Thr Ile Lys Leu Leu
                165                 170                 175

<210> SEQ ID NO 54
<211> LENGTH: 82
<212> TYPE: PRT
<213> ORGANISM: Artificial Sequence
<220> FEATURE:
<223> OTHER INFORMATION: Synthetic Sequence

<400> SEQUENCE: 54

Tyr Pro Arg His Tyr Gly Glu Cys Leu Ser Pro Val Thr Thr Pro Ser
1               5                   10                  15

Phe Phe Ser Thr Gly Gly Gly Ser Thr Pro Leu Lys Glu Glu Glu Lys
            20                  25                  30

Glu Val Val Arg Gly Gly Gly Ser Lys Lys Asn Asn Gly Thr Asn Thr
        35                  40                  45

Asn Ile Tyr Leu Asn Ile Asn Asp Thr Phe Val Lys Tyr Thr Asn Glu
    50                  55                  60

Ser Ile Leu Glu Tyr Asn Trp Asn Asn Ser Asn Ile Asn Asn Phe Thr
65                  70                  75                  80

Ala Thr

<210> SEQ ID NO 55
<211> LENGTH: 136

```
<212> TYPE: PRT
<213> ORGANISM: Artificial Sequence
<220> FEATURE:
<223> OTHER INFORMATION: Synthetic Sequence

<400> SEQUENCE: 55

Tyr Pro Arg His Tyr Gly Glu Cys Leu Ser Pro Val Thr Thr Pro Ser
1               5                   10                  15

Phe Phe Ser Thr Gly Gly Gly Ser Thr Pro Leu Lys Glu Glu Glu Lys
                20                  25                  30

Glu Val Val Arg Gly Gly Gly Ser Ser Ile Asp Tyr Trp Val Ser Phe
            35                  40                  45

Asn Lys Thr Ile Ile Leu Asp Ser Asn Ile Thr Asn Asp Asn Asn Asp
    50                  55                  60

Ile Asn Gly Val Ser Trp Asn Phe Phe Asn Asn Ser Phe Asn Thr Leu
65                  70                  75                  80

Ala Thr Cys Gly Lys Ala Gly Asn Phe Cys Glu Cys Ser Asn Tyr Ser
                85                  90                  95

Thr Ser Ile Tyr Asn Ile Thr Asn Asn Cys Ser Leu Thr Ile Phe Pro
                100                 105                 110

His Asn Asp Val Phe Asp Thr Thr Tyr Gln Val Val Trp Asn Gln Ile
            115                 120                 125

Ile Asn Tyr Thr Ile Lys Leu Leu
        130                 135

<210> SEQ ID NO 56
<211> LENGTH: 182
<212> TYPE: PRT
<213> ORGANISM: Artificial Sequence
<220> FEATURE:
<223> OTHER INFORMATION: Synthetic Sequence

<400> SEQUENCE: 56

Tyr Pro Arg His Tyr Gly Glu Cys Leu Ser Pro Val Thr Thr Pro Ser
1               5                   10                  15

Phe Phe Ser Thr Gly Gly Gly Ser Asp Ile Val Lys Ser Ala Arg Ile
                20                  25                  30

Tyr Ala Gly Gln Gly Tyr Thr Glu His Gln Ala Gln Glu Glu Trp Asn
            35                  40                  45

Met Ile Leu His Val Leu Phe Glu Glu Glu Thr Glu Ser Ser Ala Ser
    50                  55                  60

Ser Glu Asn Ile His Glu Lys Asn Asp Asn Gly Gly Gly Ser Ser Ile
65                  70                  75                  80

Asp Tyr Trp Val Ser Phe Asn Lys Thr Ile Ile Leu Asp Ser Asn Ile
                85                  90                  95

Thr Asn Asp Asn Asn Asp Ile Asn Gly Val Ser Trp Asn Phe Phe Asn
                100                 105                 110

Asn Ser Phe Asn Thr Leu Ala Thr Cys Gly Lys Ala Gly Asn Phe Cys
            115                 120                 125

Glu Cys Ser Asn Tyr Ser Thr Ser Ile Tyr Asn Ile Thr Asn Asn Cys
        130                 135                 140

Ser Leu Thr Ile Phe Pro His Asn Asp Val Phe Asp Thr Thr Tyr Gln
145                 150                 155                 160

Val Val Trp Asn Gln Ile Ile Asn Tyr Thr Ile Lys Leu Leu Gly Gly
                165                 170                 175

Gly Ser Leu Lys Thr Ser
            180
```

<210> SEQ ID NO 57
<211> LENGTH: 106
<212> TYPE: PRT
<213> ORGANISM: Artificial Sequence
<220> FEATURE:
<223> OTHER INFORMATION: Synthetic Sequence

<400> SEQUENCE: 57

```
Ala Thr Thr Ala Ser Val Gly Lys Pro Val Thr Gly Arg Pro Ala Thr
1               5                   10                  15

Asn Arg Pro Ala Thr Gly Gly Ser Glu Thr Asn Glu Cys Thr Ser
            20                  25                  30

Ser Phe Glu Thr Leu Phe Glu Gln Glu Pro Ser Ser Glu Val Pro Lys
        35                  40                  45

Asp Gly Gly Gly Ser Lys Lys Asn Asn Gly Thr Asn Thr Asn Ile Tyr
    50                  55                  60

Leu Asn Ile Asn Asp Thr Phe Val Lys Tyr Thr Asn Glu Ser Ile Leu
65                  70                  75                  80

Glu Tyr Asn Trp Asn Asn Ser Asn Ile Asn Asn Phe Thr Ala Thr Gly
                85                  90                  95

Gly Gly Ser Ser Ser Gly Gly Gly Ser Asn
            100                 105
```

<210> SEQ ID NO 58
<211> LENGTH: 128
<212> TYPE: PRT
<213> ORGANISM: Artificial Sequence
<220> FEATURE:
<223> OTHER INFORMATION: Synthetic Sequence

<400> SEQUENCE: 58

```
Pro Tyr Gln Asp Gln Gln Trp Val Glu Val Thr Pro Gln Pro Gly Thr
1               5                   10                  15

Ser Lys Pro Ala Gly Ala Thr Thr Ala Ser Val Gly Lys Pro Val Thr
            20                  25                  30

Gly Arg Pro Ala Thr Asn Arg Pro Ala Thr Asn Lys Pro Val Thr Asp
        35                  40                  45

Asn Pro Val Thr Gly Gly Gly Ser Thr Pro Leu Lys Glu Glu Glu Lys
    50                  55                  60

Glu Val Val Arg Gly Gly Gly Ser Lys His Val Glu Glu Ile Glu Ser
65                  70                  75                  80

Pro Pro Pro Glu Ser Asn Glu Glu Gln Cys Gln His Asp Asp Thr
                85                  90                  95

Thr Ser Ile His Glu Pro Ser Pro Arg Glu Pro Leu Leu Pro Lys Pro
            100                 105                 110

Tyr Ser Arg Tyr Gln Tyr Gly Gly Gly Ser Lys Cys Ser Lys Ala Glu
        115                 120                 125
```

<210> SEQ ID NO 59
<211> LENGTH: 15
<212> TYPE: PRT
<213> ORGANISM: Artificial Sequence
<220> FEATURE:
<223> OTHER INFORMATION: Synthetic Sequence

<400> SEQUENCE: 59

```
Gln Ser Ile Ala Leu Ser Ser Leu Met Val Ala Gln Ala Ile Pro
1               5                   10                  15
```

```
<210> SEQ ID NO 60
<211> LENGTH: 19
<212> TYPE: PRT
<213> ORGANISM: Artificial Sequence
<220> FEATURE:
<223> OTHER INFORMATION: Synthetic Sequence

<400> SEQUENCE: 60

Pro Val Phe Ala Gly Ala Asn Tyr Ala Ala Trp Ala Val Asn Val Ala
1               5                   10                  15

Gln Val Ile

<210> SEQ ID NO 61
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 61

Val His His Asn Thr Glu Glu Ile Val Ala Gln Ser Ile Ala Leu Ser
1               5                   10                  15

Ser Leu Met Val
            20

<210> SEQ ID NO 62
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 62

Gln Ser Ile Ala Leu Ser Ser Leu Met Val Ala Gln Ala Ile Pro Leu
1               5                   10                  15

Val Gly Glu Leu
            20

<210> SEQ ID NO 63
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 63

Val Asp Ile Gly Phe Ala Ala Tyr Asn Phe Val Glu Ser Ile Ile Asn
1               5                   10                  15

Leu Phe Gln Val
            20

<210> SEQ ID NO 64
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 64

Gln Gly Glu Ser Gly His Asp Ile Lys Ile Thr Ala Glu Asn Thr Pro
1               5                   10                  15

Leu Pro Ile Ala
            20
```

```
<210> SEQ ID NO 65
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 65

Gly Val Leu Leu Pro Thr Ile Pro Gly Lys Leu Asp Val Asn Lys Ser
1               5                   10                  15

Lys Thr His Ile
            20

<210> SEQ ID NO 66
<211> LENGTH: 14
<212> TYPE: PRT
<213> ORGANISM: Artificial Sequence
<220> FEATURE:
<223> OTHER INFORMATION: Synthetic Sequence

<400> SEQUENCE: 66

Gln Tyr Ile Lys Ala Asn Ser Lys Phe Ile Gly Ile Phe Glu
1               5                   10

<210> SEQ ID NO 67
<211> LENGTH: 14
<212> TYPE: PRT
<213> ORGANISM: Artificial Sequence
<220> FEATURE:
<223> OTHER INFORMATION: Synthetic Sequence

<400> SEQUENCE: 67

Gln Tyr Ile Lys Ala Asn Ser Lys Phe Ile Gly Ile Thr Glu
1               5                   10

<210> SEQ ID NO 68
<211> LENGTH: 15
<212> TYPE: PRT
<213> ORGANISM: Artificial Sequence
<220> FEATURE:
<223> OTHER INFORMATION: Synthetic Sequence

<400> SEQUENCE: 68

Ile Leu Met Gln Tyr Ile Lys Ala Asn Ser Lys Phe Ile Gly Ile
1               5                   10                  15

<210> SEQ ID NO 69
<211> LENGTH: 7
<212> TYPE: PRT
<213> ORGANISM: Artificial Sequence
<220> FEATURE:
<223> OTHER INFORMATION: Synthetic Sequence

<400> SEQUENCE: 69

Val Asn Asn Glu Ser Ser Glu
1               5

<210> SEQ ID NO 70
<211> LENGTH: 17
<212> TYPE: PRT
<213> ORGANISM: Artificial Sequence
<220> FEATURE:
<223> OTHER INFORMATION: Synthetic Sequence

<400> SEQUENCE: 70

Pro Gly Ile Asn Gly Lys Ala Ile His Leu Val Asn Asn Glu Ser Ser
```

```
1               5              10              15
Glu

<210> SEQ ID NO 71
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 71

Pro Asn Arg Asp Ile Leu
1               5

<210> SEQ ID NO 72
<211> LENGTH: 7
<212> TYPE: PRT
<213> ORGANISM: Artificial Sequence
<220> FEATURE:
<223> OTHER INFORMATION: Synthetic Sequence

<400> SEQUENCE: 72

Phe Ile Gly Ile Thr Glu Leu
1               5

<210> SEQ ID NO 73
<211> LENGTH: 6
<212> TYPE: PRT
<213> ORGANISM: Artificial Sequence
<220> FEATURE:
<223> OTHER INFORMATION: Synthetic Sequence

<400> SEQUENCE: 73

Ser Tyr Phe Pro Ser Val
1               5

<210> SEQ ID NO 74
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 74

Asn Ser Val Asp Asp Ala Leu Ile Asn Ser Thr Lys Ile Tyr Ser Tyr
1               5                  10                  15

Phe Pro Ser Val
            20

<210> SEQ ID NO 75
<211> LENGTH: 20
<212> TYPE: PRT
<213> ORGANISM: Artificial Sequence
<220> FEATURE:
<223> OTHER INFORMATION: Synthetic Sequence

<400> SEQUENCE: 75

Ile Asp Lys Ile Ser Asp Val Ser Thr Ile Val Pro Tyr Ile Gly Pro
1               5                  10                  15

Ala Leu Asn Ile
            20
```